US008693367B2

(12) United States Patent
Chowdhury et al.

(10) Patent No.: US 8,693,367 B2
(45) Date of Patent: Apr. 8, 2014

(54) PROVIDING OFFLOADS IN A COMMUNICATION NETWORK

(75) Inventors: Kuntal Chowdhury, Andover, MA (US); Mohan Rangan, Nashua, NH (US); Taiwo Oyedele, Reading (GB); Michael Digiorgio, Reading, MA (US); Rajeev Koodli, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 12/891,535

(22) Filed: Sep. 27, 2010

(65) Prior Publication Data

US 2011/0075557 A1  Mar. 31, 2011

Related U.S. Application Data

(60) Provisional application No. 61/246,118, filed on Sep. 26, 2009, provisional application No. 61/257,712, filed on Nov. 3, 2009.

(51) Int. Cl.
*H04L 12/26* (2006.01)

(52) U.S. Cl.
USPC .......................................................... 370/253

(58) Field of Classification Search
USPC ............ 709/239; 370/253, 331; 455/436, 439
See application file for complete search history.

(56) References Cited

U.S. PATENT DOCUMENTS

| 5,898,713 | A | 4/1999 | Melzer et al. |
| 6,643,621 | B1 | 11/2003 | Dodrill et al. |
| 6,917,592 | B1 | 7/2005 | Ramankutty et al. |
| 7,792,113 | B1 | 9/2010 | Foschiano et al. |
| 7,808,919 | B2 | 10/2010 | Nadeau et al. |
| 7,827,256 | B2 | 11/2010 | Phillips et al. |
| 7,856,512 | B2 | 12/2010 | Hilla et al. |
| 7,885,248 | B2 | 2/2011 | Harper et al. |
| 7,885,260 | B2 | 2/2011 | Paul et al. |
| 7,890,636 | B2 | 2/2011 | Grayson et al. |

(Continued)

FOREIGN PATENT DOCUMENTS

| EP | 1250022 A1 | 10/2002 |
| EP | 1619917 A1 | 1/2006 |
| EP | 1978685 A1 | 10/2008 |
| WO | WO-2009089455 A1 | 7/2009 |

OTHER PUBLICATIONS

International Search Report and Written Opinion issued for PCT/US2010/50418, dated Nov. 19, 2010 (14 pages).

(Continued)

*Primary Examiner* — Raj Jain
(74) *Attorney, Agent, or Firm* — Wilmer Cutler Pickering Hale and Dorr LLP

(57) ABSTRACT

This disclosure relates to a system and method for offloading selected data to an alternate communication network. The offloading provides another route for selected packet traffic that can relieve the burden on a mobile operator's network, such as the backhaul and core networks. As the proliferation of data rich content and increasingly more capable mobile devices has continued, the amount of data communicated over mobile operator's networks has exponentially increased. Upgrading the existing network that was designed for voice calls is not desirable or practical for many mobile operators. A offload gateway is provided that inspects packets and determines those packets to offload to an alternate network as well as providing mobility management to allow for seamless handoffs and gateway relocations.

20 Claims, 23 Drawing Sheets

(56) References Cited

U.S. PATENT DOCUMENTS

| | | | |
|---|---|---|---|
| 2003/0028644 | A1 | 2/2003 | Maguire et al. |
| 2004/0224678 | A1 | 11/2004 | Dahod et al. |
| 2005/0091371 | A1 | 4/2005 | Delegue et al. |
| 2005/0239473 | A1 | 10/2005 | Pan et al. |
| 2006/0018328 | A1 | 1/2006 | Mody et al. |
| 2006/0234678 | A1* | 10/2006 | Juitt et al. ............... 455/411 |
| 2006/0291388 | A1 | 12/2006 | Amdahl et al. |
| 2007/0097983 | A1 | 5/2007 | Nylander et al. |
| 2007/0105568 | A1 | 5/2007 | Nylander et al. |
| 2007/0116019 | A1 | 5/2007 | Cheever et al. |
| 2007/0116020 | A1 | 5/2007 | Cheever et al. |
| 2007/0243872 | A1 | 10/2007 | Gallagher et al. |
| 2007/0253328 | A1 | 11/2007 | Harper et al. |
| 2008/0137541 | A1 | 6/2008 | Agarwal et al. |
| 2008/0162637 | A1* | 7/2008 | Adamczyk et al. ........... 709/204 |
| 2008/0188223 | A1 | 8/2008 | Vesterinen et al. |
| 2008/0316980 | A1 | 12/2008 | Ahlen et al. |
| 2009/0061821 | A1 | 3/2009 | Chen et al. |
| 2009/0061873 | A1 | 3/2009 | Bao et al. |
| 2009/0067417 | A1 | 3/2009 | Kalavade et al. |
| 2009/0086742 | A1 | 4/2009 | Ghai et al. |
| 2009/0089447 | A1 | 4/2009 | Balachandran et al. |
| 2009/0098872 | A1 | 4/2009 | Deshpande et al. |
| 2009/0129271 | A1 | 5/2009 | Ramankutty et al. |
| 2009/0156213 | A1* | 6/2009 | Spinelli et al. ............... 455/436 |
| 2009/0207759 | A1* | 8/2009 | Andreasen et al. ........... 370/259 |
| 2009/0215438 | A1 | 8/2009 | Mittal et al. |
| 2009/0262682 | A1 | 10/2009 | Khetawat et al. |
| 2009/0286510 | A1* | 11/2009 | Huber et al. ............... 455/410 |
| 2010/0077102 | A1 | 3/2010 | Lim et al. |
| 2010/0091653 | A1 | 4/2010 | Koodli et al. |
| 2010/0124933 | A1 | 5/2010 | Chowdhury et al. |
| 2010/0195640 | A1 | 8/2010 | Park et al. |
| 2010/0291897 | A1 | 11/2010 | Ghai |
| 2011/0021192 | A1 | 1/2011 | Grayson et al. |
| 2011/0021196 | A1 | 1/2011 | Grayson et al. |
| 2011/0058479 | A1 | 3/2011 | Chowdhury |
| 2011/0075675 | A1 | 3/2011 | Koodli et al. |

OTHER PUBLICATIONS

International Search Report and Written Opinion issued for PCT/US2010/50427, mailed Mar. 6, 2012 (9 pages).
3GPP TR 25.820 v8.0.0 (Mar. 2008), 3rd Generation Partnership Project; Technical Specification Group Radio Access Networks; 3G Home NobeB Study Item Technical Report (Release 8); http://www.3gpp.org, 2008. 37 pages.
3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.
3GPP TS 22.011 v8.4.0 (Jun. 2008), 3rd Generation Partnership Project; Technical Specification Group Services and System Aspects; Service accessibility (Release 8), Global System for Mobile Communications, http://www/3gpp.org, 2008. 25 pages.
3GPP TS 22.220 v0.3.0 (Jul. 2008), 3rd Generation Partnership Project; Technical Specification Group Services and System Aspects; Service requireements for Home NodeBs and Home eNodeBs; (Release 9), http://www.3gpp.org, 2008. 13 pages.
3GPP TS 23.041 v7.0.0 (Mar. 2006), 3rd Generation Partnership Project; Technical Specification Group Terminals; Technical realization of Cell Broadcast Service (CBS) (Release 7), Global System for Mobile Communications, http://www.3gpp.org, 2006. 36 pages.
3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.
3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.
3GPP TS 23.153 v7.2.0 (Mar. 2007), 3rd Generation Partnership Project; Technical Specification Group Core Network and Terminals; Out of band transcoder control; Stage 2 (Release 7); Global System for Mobile Communications, http://www.3gpp.org, 2007. 77 pages.
3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.
3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.
3GPP TS 23.236 v. 10 Technical Specification. "3rd Generation Partnership Project; Technical Specification Group Services and Systems Aspects; Intra-Domain Connection of Radio Access Network (RAN) Nodes to Multiple Cor Network (CN) Nodes (Release 10)." Mar. 2010. 39 pages.
3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.
3GPP TS 23.251 v7.0.0 (Jun. 2007), 3rd Generation Partnership Project; Technical Specification Group Services and System Aspects; Network Sharing; Architecture and functional description (Release 7), Global System for Mobile Communications, http://www.3gpp.org, 2007. 18 pages.
3GPP TS 24.234 v7.5.0 (Mar. 2007), 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 7), Global System for Mobile Communications, http://www.3gpp.org, 2007. 32 pages.
3GPP TS 25.412 v7.1.0 (Jun. 2006), 3rd Generation Partnership Project; Technical Specification Group Radio Access Network; UTRAN Iu interface signaling transport (Release 7), http://www.3gpp.org, 2006. 11 pages.
3GPP TS 25.410 v7.0.0 (Mar. 2006), 3rd Generation Partnership Project; Technical Specification Group Radio Access Network; UTRAN Iu Interface: general aspects and principles (Release 7), http://www.3gpp.org, 2006. 28 pages.
3GPP TS 25.411 v7.1.0 (Sep. 2007); 3rd Generation Partnership Project; Technical Specification Group Radio Access Network; UTRAL Iu interface layer 1 (Release 7), http://www.3gpp.org, 2007. 9 pages.
3GPP TS 25.413 V7.8.0 (Dec. 2007), 3rd Generation Partnership Project; Technical Specification Group Radio Access Network; UTRAN Iu interface Ranap signaling (Release 7), http://www.3gpp.org, 2007. 359 pages.
3GPP TS 25.414 v7.1.0 (Sep. 2006), 3rd Generation Partnership Project; Technical Specification Group Radio Access Network; UTRAN Iu interface transport and transport signaling (Release 7), http://www.3gpp.org, 2006. 20 pages.
3GPP TS 25.415 v7.3.0 (Dec. 2006), 3rd Generation Partnership Project; Technical Specification Group Radio Access Network; UTRAN Iu interface user plane protocols (Release 7), http://www.3gpp.org, 2006. 64 pages.
3GPP TS 25.419 v7.0.0 (Mar. 2006), 3rd Generation Partnership Project; Technical Specification Group Ran; UTRAN Iu-BC Interface: Service Area Broadcast Protocol (SABP) (Release 7), http://www.3gpp.org, 2006. 77 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.
3GPP TS 29.232 v8.3.0 (Jun. 2008), 3rd Generation Partnership Project; Technical Specification Group Core Network and Terminals; Media Gateway Controller (MGC)—Media Gateway (MGW) interface; Stage 3 (Release 8), http://www.3gpp.org, 2008. 145 pages.

(56) References Cited

OTHER PUBLICATIONS

3GPP TS 29.234 v7.9.0 (Jun. 2008), 3rd Generation Partnership Project; Technical Specification Group Core Network and Terminals; 3GPP system to Wirelss Local Area Network (WLAN) interworking; Stage 3 (Release 7); http://www.3gpp.org, 2008. 92 pages.

3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.

3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.

3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.

3GPP TS 33.234 v8.1.0 (Mar. 2008), 3rd Generation Partnership Project; Technical Specification Group Service and System Aspects; 3G Security; Wirelss Local Area Network (WLAN) interworking security (Release 8), http://www.3gpp.org, 2008. 101 pages.

3GPP TS 43.318 v8.1.0 (Feb. 2008), 3rd Generation Partnership Project; Technical Specification Group GSM/EDGE Radio Access Network; Generic Access Network (GAN); Stage 2 (Release 8); Global System for Mobile Communications, http://www.3gpp.org, 2008. 122 pages.

3GPP TS. 23.203 v. 11.3.0 Technical Specification. "3rd Generation Partnership Project; Technical Specification Group Services and System Aspects; Policy and charging control architecture (Release 11)", Sep. 2011, 167 pages.

3GPP TS. 23.401 v. 10.5.0 Technical Specification. "3rd Generation Partnership Project; Technical Speficiation Group Services and System Aspects: General Packet Radio Service (GPRS) enhancements for Evolved Universal Terrestrial Radio Access Network (E-UTRAN) access (Release 10)." Sep. 2011, 282 pages.

3GPP TR. 23.829 v. 10.0.1 Technical Specification. "3rd Generation Partnership Project; Technical Specification Group Services and System Aspects; Local IP Access and Selected IP Traffic Offload (LIPA-SIPTO) (Release 10)." Oct. 2011, 43 pages.

* cited by examiner

PROVIDING OFFLOADS IN A COMMUNICATION NETWORK

CROSS-REFERENCE TO RELATED APPLICATIONS

This application claims benefit under 35 U.S.C. §119(e) of U.S. Provisional Patent Application Nos. 61/246,118, entitled "Providing an Offload Solution for a Communication Network", filed Sep. 26, 2009; and 61/257,712, entitled "Providing Offloads in a Communication Network", filed Nov. 3, 2009; this application is also related to the application entitled "Providing Services at a Communication Network EDGE", filed Sep. 27, 2010, application Ser. No. 12/891,636, each of which is hereby incorporated by reference herein in its entirety.

FIELD OF THE DISCLOSURE

This disclosure relates to a system and method for providing for offloading selected data to an alternate communication network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. A macro cell transceiver is typically used by service providers to provide coverage over about a five kilometer distance. A pico cell transceiver can provide coverage over about a half kilometer distance, and a femto cell transceiver can provide coverage over a 50-200 meter distance. A femto cell transceiver is similar in coverage to a WiFi (WLAN) access point and can be used to provide network access over a short range.

Overview

Certain embodiments disclose a method including establishing a session on an offload gateway to communicate with a user equipment (UE), receiving a packet on an interface at the offload gateway with the session that is bound to or from the user equipment (UE), inspecting the packet to obtain information regarding the packet to make an offload determination, determining if the packet meets offload criteria by comparing information obtained from inspection with offload logic criteria, upon determining that the packet is offload eligible, modifying the packet at a network address translation functionality to route the packet onto an Internet to bypass a packet core network, and sending a non-offload eligible packet to a home gateway in the packet core network.

DESCRIPTION OF EXAMPLE EMBODIMENTS

The growth of mobile broadband data can strain operators' existing packet core elements, increase mobile Internet delivery cost, and challenging the flat-rate data service models.

The majority of this traffic can be either Internet bound or sourced from the Internet, but is currently flowing (or will be flowing) through the operator's packet core. As a result, operators are paying more in capital and operating expenditures that can be reduced by offloading the data from the operator's network onto the Internet. Offloading can involve interconnection and interworking between different networks and network equipment. As data is received by a gateway, this gateway can determine which data can be offloaded onto the Internet rather than being backhauled on the operator's network. The gateway can also facilitate offloading with multiple access networks, such as a radio access network (RAN), a femto access network, a wireless local area network (WLAN), a WiMAX network, or any other fixed-mobile convergence solution.

The gateway based offload function enables Fixed Network Operators to help Mobile Network Operators (MNOs) significantly reduce their capital expenditures in expanding/upgrading Packet Switched Core and Service LAN deployments to accommodate growing mobile data volumes. The offload function is designed to have minimal impact to MNO's existing network architecture and design, with complete transparency to end-users, whilst improving overall end-user experience in terms of reduced end-to-end latency. The Offload Gateway can be used to relieve signaling/session capacity constraints by selectively peeling-off/terminating sessions locally.

The traffic offloading can include a traffic engineering mechanism where a portion of mobile network traffic is forwarded to and from the Internet without traversing the mobile operator's transport network and the traditional gateway. With the advances in mobile network engineering, it is now feasible to connect a Radio Access Network (RAN) with high-speed networking technologies such as Gigabit Ethernet which allow a local point of presence (POP) to the Internet. At the same time, transporting some of the mobile network traffic, such as Internet video, rich web content, via the traditional gateway is becoming both expensive and performance-limited. The offload gateway can be implemented to ensure that a) each offload gateway can be deployed seamlessly without introducing disruptions to the existing network architectures, and b) mobility of user sessions is preserved. For nomenclature, Internet traffic refers to the traffic that is offloaded without traversing the mobile operator's core network, and Home traffic refers to the traffic that is sent via the operator's core network to the home gateway. The home gateway can include a gateway that provides anchor like functionality such as a gateway GPRS support node (GGSN) or a packet data network gateway (PGW), for example.

Figure 1:
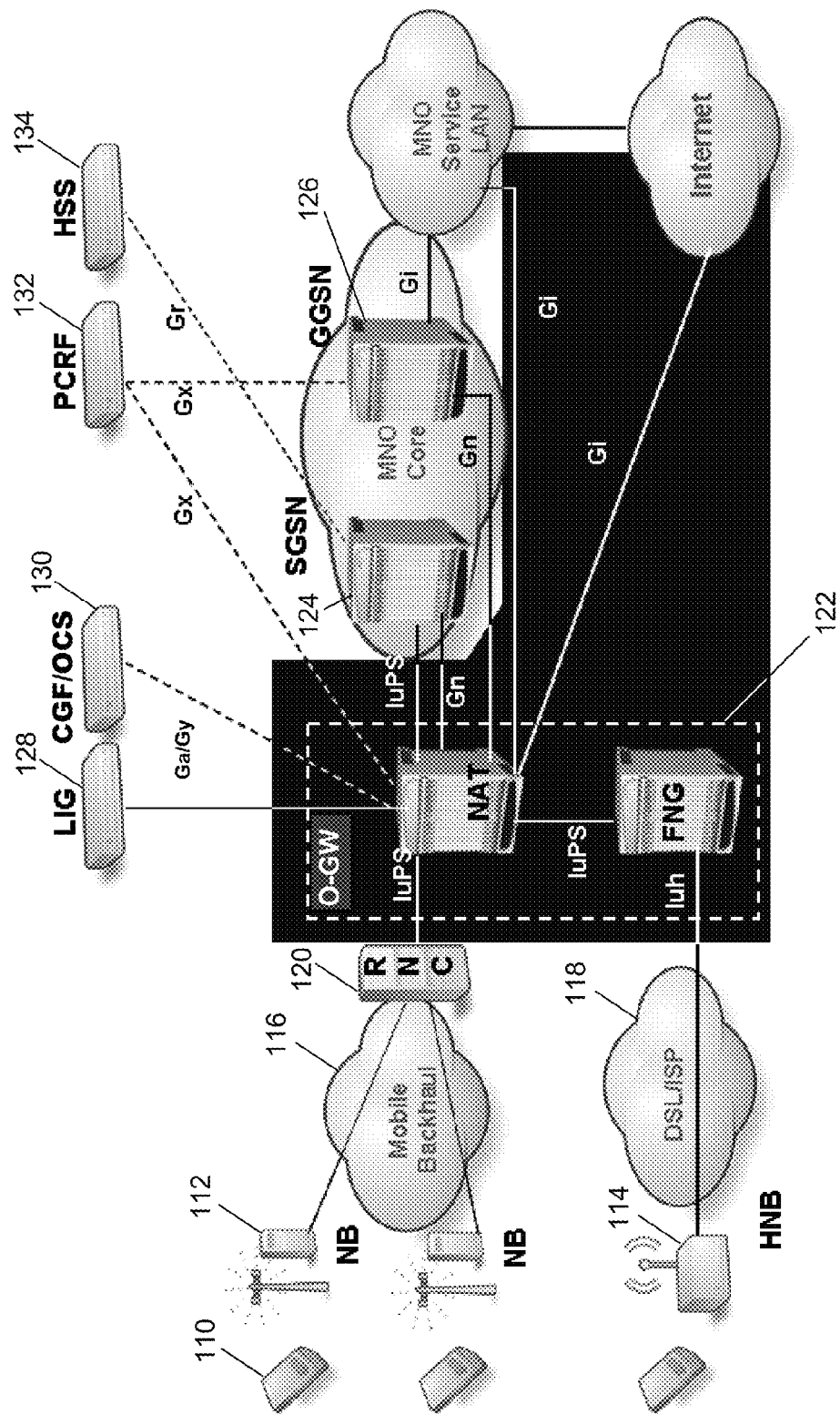
FIG. 1 is a block diagram of a communication system in accordance with certain embodiments.

The gateway, at a high level, implements an intelligent offload gateway (offload GW) which is capable of making intelligent decisions based on several criteria as to whether traffic is i) offloaded directly to the internet, bypassing the MNO Core and Service LAN, is ii) steered towards the MNO Service LAN, or is iii) not offloaded at all and routed back into the MNO's packet Core. The offload GW, in some embodiments, is physically located on an interface to the radio access network such as the MNO's IuPS interface as depicted in FIG. 1. The offload GW can have an interface on at least each of the following interfaces: IuPS control plane (CP) and user plane (UP), Gn CP and UP, and Gi. The offload gateway can steer traffic appropriately based on a number of criteria depending on the MNO's requirements. Examples of criteria used for traffic steering include QoS, Application type (web browsing, Email, video streaming, P2P traffic and even specific URLs), access point name (APN), Time of day, Fair Usage threshold, for example. The Offload policy decision can be implemented either standalone on the "Offload GW" or in conjunction with an external Policy Charging and Rules Function. Based on the decision of the "offload logic", traffic will be sent to a "next hop address" of either the MNO's service LAN or the Internet. Traffic (e.g., packet data units) that do not match any criteria can sent back out on the Gn interface to the MNO's home gateway, in some embodiments.

FIG. 1 illustrates a communication network with an offload gateway in accordance with certain embodiments. FIG. 1 includes user equipment (UE) 110, a NodeB (NB) 112, a home NodeB (HNB) 114, a mobile backhaul network 116, a broadband network 118, radio network controller (RNC) 120, an Offload Gateway (O-GW) 122, a Serving GPRS Support Node (SGSN) 124, a Gateway GPRS Support Node (GGSN) 126, a Lawful Interception Gateway (LIG) 128, a Charging Gateway Function/Online Charging System (CGF/OCS) 130, a Policy and Charging Rules Function (PCRF) 132, and a Home Subscriber Server (HSS) 134. As shown, Offload gateway 122, which can be implemented on a gateway device, can include a Network Address Translation (NAT) functionality and a Femto Network Gateway (FNG) among other things. The offload gateway 122 can be used to interwork and interconnect with a HNB 114 from the femto network, a NodeB 112 from the UMTS network, a SGSN 124 and GGSN 126 on the operator's network, the Internet, LIG 128, CGF 130, and PCRF 132.

The offload gateway 122 can be deployed at the Iu-PS interface, which can save the cost of backbone travel. The offload can be enabled by NAS and radio access network application part (RANAP) message inspection, shallow packet inspection/deep packet inspection (SPI/DPI), and NAT. The offload policies can be configured via operations, administration, and maintenance (OAM) or other policy server (e.g., PCRF 132) to the offload gateway. The gateway, in addition to providing offload functionality, can also provide paging, charging and lawful interception functions. The offload gateway can implement bearer plane packet inspection with specific and select control plane packet inspection. The offload gateway can be used with different access networks technologies, e.g., with 2G, 2.5G, 3G (e.g., UMTS), and 4G (LTE-SAE). In providing offloading to a UMTS network, the offload gateway can be implemented as a serving/gateway General packet radio service Support Node (xGSN).

The offload GW can provide a number of functions. These include a proxy, an interface, an inspection module, a network address translation (NAT) functionality, and other functionalities. The proxy, which can be implemented on the Gn interface, captures subscriber and session information during session establishment such as PDP context activation. The interface can be a IuPS user plane (UP) interface connectivity to intercept, capture and analyze mobile broadband data traffic. Deep Packet Inspection can be used for inspection of packet data units (PDUs) to make offload decisions based on preconfigured policy rules. An IuPS control plane (CP) module can be implemented to provide full mobility for offloaded traffic. A packet modification functionality such as a NAT functionality can be provided for routability of uplink data to the Internet as well as downlink data to the user equipment (UE). Other gateway functionalities can also be provided such as a Femto Network Gateway and Security Gateway for terminating and offloading traffic originating from Femtocells, an ASNGW for terminating and offloading traffic originating from a WiMAX RAN, or any other access gateway.

The offload gateway (OGW) can be both physically and logically located on different interfaces in the operator's network in order to provide offload services. The offload gateway inspects control plane and/or user plane traffic to make offloading decisions. In order to accomplish the offloading, the offload gateway builds state information of subscribers and correlates between UE identification information and session establishment messages. In some embodiments, a session is used to track and maintain information for a particular data connection or call. In an UMTS embodiment, the state information is built in order to correlate between IMSI/PTMSI and PDP establishment messages. This information is obtained from performing packet assembly and parsing signaling packets/signaling transactions or from another network device. In a UMTS embodiment, the offload gateway snoops on the IuPS interface, while in LTE the offload gateway can snoop on interfaces and include the SGW within the offload gateway.

The offload gateway can be physically located on the interface between the core network and the radio access network (RAN). There can be an offload gateway per IuPS link, but the offload gateway can serve more than one RNC and can scale commensurate to the number of RNCs communicating with the SGSN. The offload gateway can be located either close to the RNC, appropriate for one-to-one distribution with RNCs or, close to the SGSN, appropriate for one-to-many distribution with RNCs.

In some embodiments, the offload gateway is physically located on the IuPS interface, between the RNC and the SGSN, but, logically on the Gn/Gp. This arrangement provides path capacity savings between the RAN and core network (CN) as well as within the CN. This multiple interface snooping also provides a greater ability to address mobility issues such as handovers and paging of idle state UEs. Control plane offloading of GGSNs can also be incorporated in a multiple interface snooping embodiment. This multiple interface embodiment additionally allows scaling characteristics where subscriber scaling can be proportional to the number of activated subscribers (SAAU) at the SGSN, rather than the attached subscribers (SAU). Additionally, this offload gateway implementation leaves the network topology unchanged or relatively unchanged. For example, connection releases due to data plane inactivity at the SGSN/GGSN can be avoided by the offload gateway "tickling" the nodes, for the offloaded subscribers, at appropriate intervals.

The offload gateway can operate in at least two modes: i) a standalone offload mode and ii) a SGSN assisted offload mode. In the standalone mode, the offload gateway intercepts both control-plane and data-plane traffic on the IuPS. The offload gateway parses the control-plane to derive the IuPS data-plane identifiers being used by the RNC and the SGSN as well as the relationship between IMSI and P-TMSI for a given subscriber. This information can then be correlated or organized into a table. The control-plane traffic can be parsed for further information such as related to inter-RNC mobility events. In the SGSN assisted mode, the offload gateway depends on the SGSN to provide information on subscriber GTP end-point identifiers (IP Address/TEID) and mobility events. In this mode, the offload gateway can monitor the IuPS interface for control-plane events, however, the majority of the activity occurs on the user plane. The data in the user plane can be IP routed through the offload gateway to enter into and pass out of the operator's communication network.

For the "standalone offload" mode of operation, the offload gateway intercepts the IuPS control plane and parse the contents for radio access bearer (RAB) assignments and inter-RNC handoff related messages (intra-RAUs and SRNS procedures). The offload gateway also parses for the relationship between the IMSI and the P-TMSI for the subscribers that are eligible for offloading. In order to parse this relationship, the offload gateway can track, for example, PDP-activation-requests on the IuPS side, apriori. In standalone offload, the interfaces can be based on different protocols. If the interface is IP based, the control and data plane are IP routed through the offload gateway. If the interface is asynchronous transfer mode (ATM) based, then permanent virtual connections/circuits (PVCs) corresponding to the control-plane are terminated at the offload gateway, and the offload gateway can cross-connect the PVCs between the SGSN and the RNCs. The data-plane may also require PVC termination at the offload gateway if the connections between the RNC and the SGSN are point-to-point ATM links.

Interface connections provide access to the control and data planes for the offload gateway. The interface connections allow the offload gateway to make decisions on packet data protocol (PDP) session establishments that pass through the offload gateway. An offload decision is made either immediately or at some later point of time based on criteria. The criteria can be multi-tiered allowing for a quick inspection of message traffic using an initial criteria and then using additional criteria to make the decision of whether to offload. The first tier is therefore used to quickly determine relevance and can be used to reduce processing burdens on the offload gateway. The initial criteria for offloading can be the APN. In this case, the initial eligibility criterion decision can be made on the basis of the APN/IMSI/IMEI/Location.

In operation, for control plane connection request messages that meet the offloading criterion, the offload gateway substitutes its address and other information for those in the message. On receiving the corresponding connection response message, the offload gateway substitutes the home gateway's address and tunnel end point identifier (TEID) with its local address and identification information before forwarding the message. These modifications to the messages allow the offload gateway to receive the corresponding traffic in place of the other functions so the traffic passes through the offload gateway and bypasses the core network.

For example, in an UMTS embodiment, for the create PDP context requests that meet the offloading criterion, the offload gateway substitutes a local IP address and TEID for the IP address and TEID of the SGSN, before forwarding to the GGSN. On receiving the corresponding create PDP response, the offload gateway swaps out the GGSNs address and TEID with a local address and TEID before forwarding to the SGSN. Thus, for these PDPs, the offload gateway looks like the SGSN to the GGSN, and the GGSN to the SGSN. Given these modifications to the messages, the offload gateway inserts itself to monitor subsequent control and data plane events, and can provide offload services to the user equipment. A network address translation functionality can be used in order to make the modifications to the selected messages. The offload gateway can also use the Gn interface to selectively send downlink packets, for off-loaded packet streams, to the SGSN in order to execute paging or to prevent inactivity timers from firing.

The offload gateway includes an interface to communicate with the public network or Internet. The Gi/SGi interface on the offload gateway plays the same role as on the home gateway, which is to serve as an exit/entry point to the Internet. The primary difference is that the IP packets exiting/entering the offload gateway, on this interface, include a locally allocated address instead of the home gateway allocated subscriber address as the source/destination. This modification can be performed using a network address translation functionality in order to map and substitute the information.

The Ga is the standard charging interface utilizing the GPRS tunneling protocol (GTP). The offload gateway includes the capabilities of the GGSN in terms of this interface. These capabilities allow the offload gateway to reconcile charging records that are generated by the offload gateway instead of/in-addition to the GGSN. The offload gateway provides the functionality to turn on charging selectively and also provides the functionality to generate either G-CDRs or S-CDRs. The Gx is the interface to the PCRF over Diameter. The offload gateway includes the capabilities of the GGSN in terms of this interface and provides the functionality to function as a policy and charging enforcement function (PCEF). The Gy is the interface to the OCS over Diameter. The offload gateway includes the capabilities of the GGSN in terms of this interface and can function as a PCEF.

Figure 2:
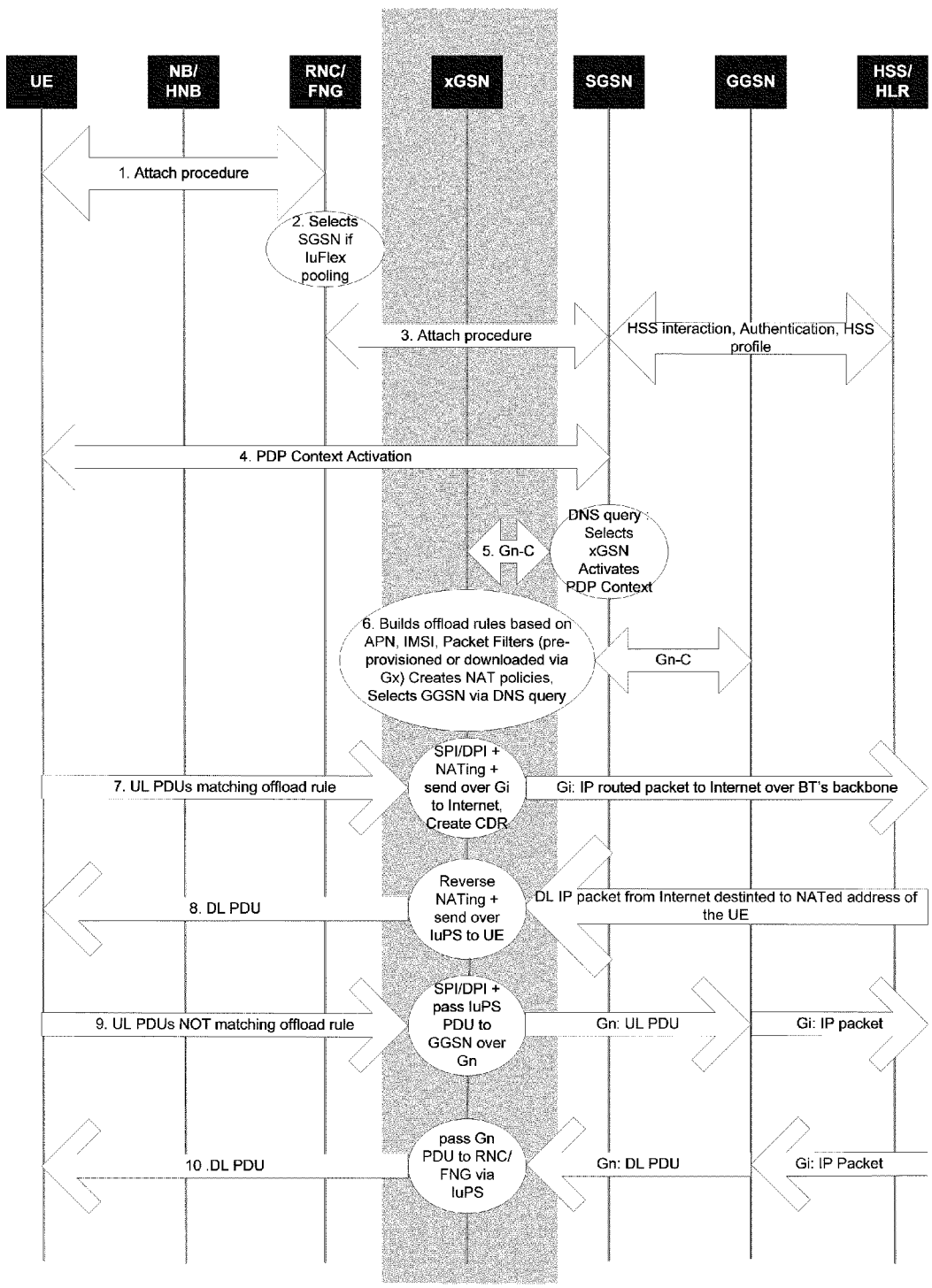
FIG. 2 is a call flow diagram of Session Establishment and Selective Offloading in accordance with certain embodiments.

Below with FIGS. 2-13, the offload gateway in a UMTS embodiment is described with the offload gateway being implemented as a xGSN. Other types of offload gateways may be implemented such as a serving gateway (SGW) or a packet data network gateway (PGW) in a 4G network to provide offload functionality as described herein. FIG. 2 illustrates a call flow diagram of Session Establishment and Selective Offloading in accordance with certain embodiments. In step 1, the UE initiates an Attach procedure with the UMTS network. In step 2, the RNC selects a SGSN from a pool of SGSNs if IuFlex pooling is used. Otherwise, the RNC sends the Attach Request to the designated SGSN. In step 3, the SGSN handles the Attach procedure and performs HSS interaction to authenticate and authorize the UE. At the end of this successful transaction, the UE is attached to the UMTS system. The SGSN also gets the subscription profile of the user from HSS. In step 4, the UE initiates PDP context activation procedure. In step 5, the SGSN selects xGSN as the GGSN for the PDP context using any standard procedure, e.g. DNS resolution of the APN. At this step, the SGSN selects an xGSN which is an Offload GW. In some embodiments, the SGSN selection is performed independently of the offload mechanism. The DNS server can be configured to return xGSN address(es). The SGSN performs PDP context establishment procedure with the xGSN.

In step 6, upon receiving the tunneling protocol (e.g., GTP-C) message from SGSN, the xGSN creates a session state for the PDP context using the received information such as APN, international mobile subscriber identity (IMSI), temporary mobile subscriber identity (TMSI), user location information (ULI), for example. The xGSN performs a GGSN selection procedure by at least one of the following methods. First, forming a special FQDN (e.g., mcc123.mnc123.ggsn.gprs) and using the same DNS infrastructure as used by SGSN. The DNS can map to the actual GGSN for this string. Second, the xGSN can go to a special/separate DNS infrastructure with the same string as used by the SGSN. Third, the xGSN can have local configuration to resolve it to a GGSN address.

After selecting the GGSN, the xGSN performs Gn or Gp interface establishment with this node by sending a Create PDP context request. The GGSN creates the PDP context and assigns PDP address (e.g., an IPv4 or IPv6 address) for the UE. Upon receiving the Create PDP context response, the xGSN completes the PDP context establishment procedure with the SGSN. In the response message to the SGSN, the xGSN includes the cell global identification (CGI)/service area identity (SAI)/routing area identifier (RAI) change report information element (IE). At this stage, the xGSN also creates the offloading rule set based on APN, traffic filters (based on, e.g., destination/source port, destination/source address, URL, time of day, and remaining usage limit for a given application). To fetch some of this information, the xGSN may use the Gx interface with the PCRF and the Ga/Gy interface with the CGF/OCS.

In step 7, the UE begins to send IP traffic on the uplink (UL). The xGSN is on the path of IuPS and it intercepts the corresponding packets from the UE. After intercepting a packet, the xGSN performs Shallow or Deep Packet Inspection (SPI/DPI) in order to determine offloading eligibility for the packet using the offloading rule set established in step 6. If there is a match, the xGSN performs next level determination of whether the packet uses MNO's Service LAN traversal. If it uses MNO's service LAN traversal, the xGSN sends the packet over a L2 or L3 tunnel over the Gi interface to the MNO's Service LAN. Otherwise, the xGSN performs NAT operation on the IP packet (e.g., basic NAT operation includes changing the IP source address) before sending it over Gi to the internet or to the IP packet's destination. In both of these cases, the xGSN may perform G-CDR generation if desired by the operator's policy. The xGSN also performs lawful intercept of the packets (e.g., CC) if desired.

In step 8, when a packet is received from the Internet or any IP domain at the xGSN, it performs reverse NAT operation on the packet based on its NAT state. The xGSN performs G-CDR generation for the received downlink (DL) packet and sends the packet over IuPS-U to the RNC. In step 9, the UE sends a packet on the UL which does not match the offloading rule set. The xGSN sends it over Gn (or Gp) interface to the GGSN and generates G-CDR for it, if desired. In step 10, when a DL packet is received at the xGSN from the GGSN, the xGSN generates G-CDR as per the operator's policy and sends it over IuPS-U to the RNC.

Figure 3:
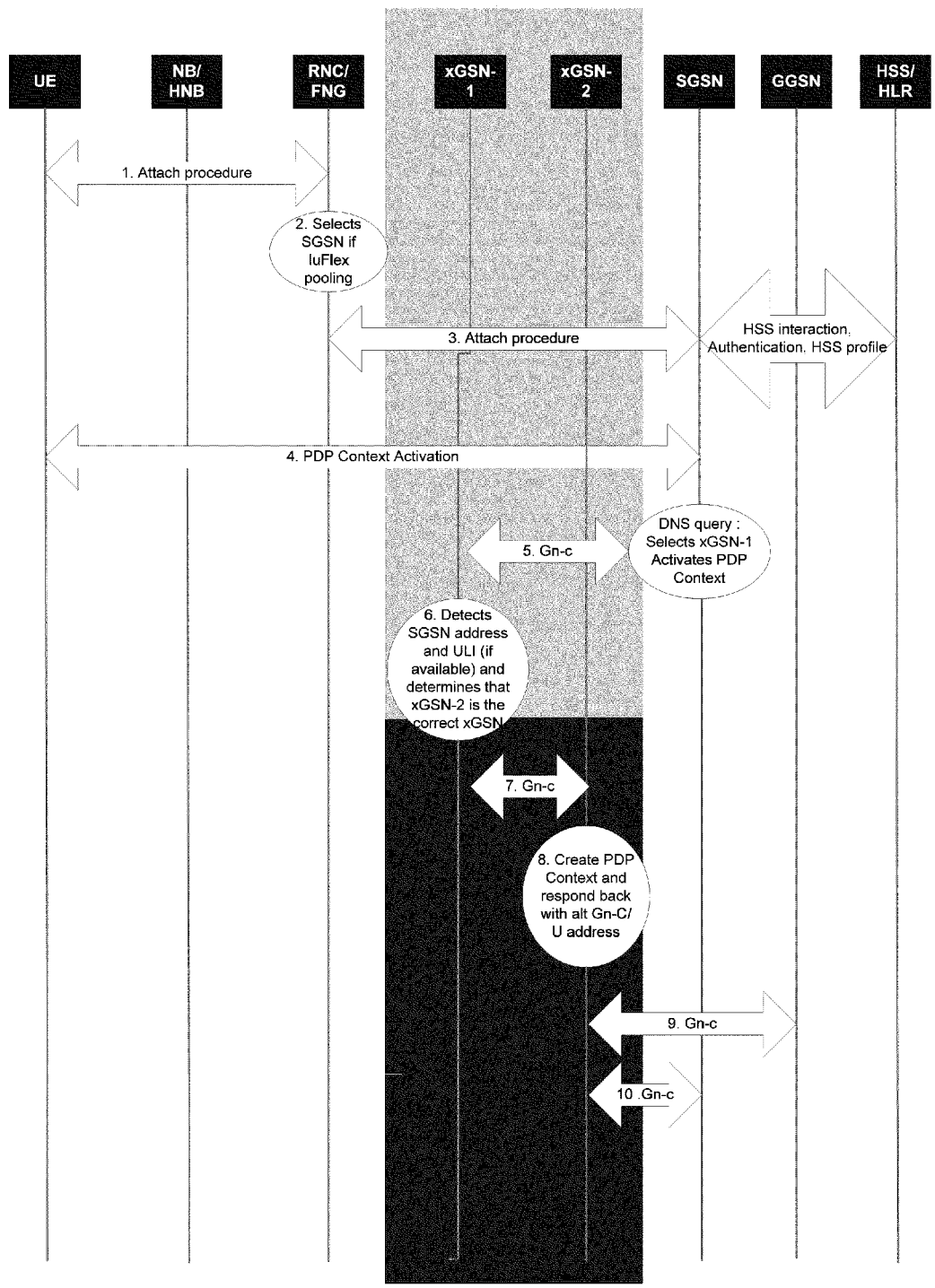
FIG. 3 is a call flow diagram of Session Establishment and Selective Offloading in accordance with certain embodiments.

FIG. 3 illustrates session establishment and selective offloading in accordance with certain embodiments. In this scenario, the SGSN selects an xGSN which is not the correct xGSN for the session. The xGSNs, or the gateway device providing the xGSN, can implement a mapping table that maps an SGSN address (IP address) to one or a set of xGSNs. If it is a set of xGSNs, then a further extension to this mapping table is implemented using User Location Information (ULI) which has the Service Area Code (SAC) information for the specific RNC for the session. With this input, the xGSN can determine whether the SGSN selected is the correct xGSN. Steps 1-5 in the FIG. 3 call flow are same as described in the call flow of FIG. 2.

In step 6, upon receiving the Update PDP context request message from the SGSN, the xGSN-1 performs the following check: Does it belong to the set of xGSNs for SGSN identified by the IP address of the SGSN? If YES, and there is only one xGSN in the set, and it continues with the procedure as detailed in FIG. 2. Otherwise, it looks into the ULI IE for the SAC and determines whether the RNC corresponds to the SAC is on-path. If Yes, it continues with the procedure in FIG. 2. Otherwise, it determines that the SGSN selected an incorrect xGSN and it begins xGSN re-selection steps. Before doing that, the xGSN-1 determines the correct xGSN address (xGSN-2). If NO, the xGSN-1 determines the correct xGSN (xGSN-2) address using the SGSN address and ULI/SAC info along with the mapping table that is configured in the xGSNs. If a ULI IE is not present in the Update PDP Context message from SGSN, it is assumed that a 1:1 relationship between xGSN and SGSN exists in the system. In order to ensure the presence of ULI, the xGSN sets the CGI/SAI/RAI change report IE in Create and Update PDP context response messages.

In step 7, the xGSN-1 forwards the Create PDP Context Request message to xGSN-2. This serves as a notice to xGSN-2 that xGSN re-selection has been performed by xGSN-1 and it is chosen to serve the session. In step 8, the xGSN-2 creates a PDP context for the UE and selects a GGSN as described in FIG. 2. In step 9, the xGSN-2 completes PDP context creation with the GGSN. At this step, it receives the PDP address (v4, v6) from the GGSN and it is ready to respond to SGSN. In step 10, the xGSN-2 sends a Create PDP Context Response message to the SGSN in which it includes its GTP-C/GTP-U addresses as alternative addresses for the SGSN to use for the duration of the PDP session. The remaining part of the offloading operation can be implemented as described in FIG. 2.

Figure 4:
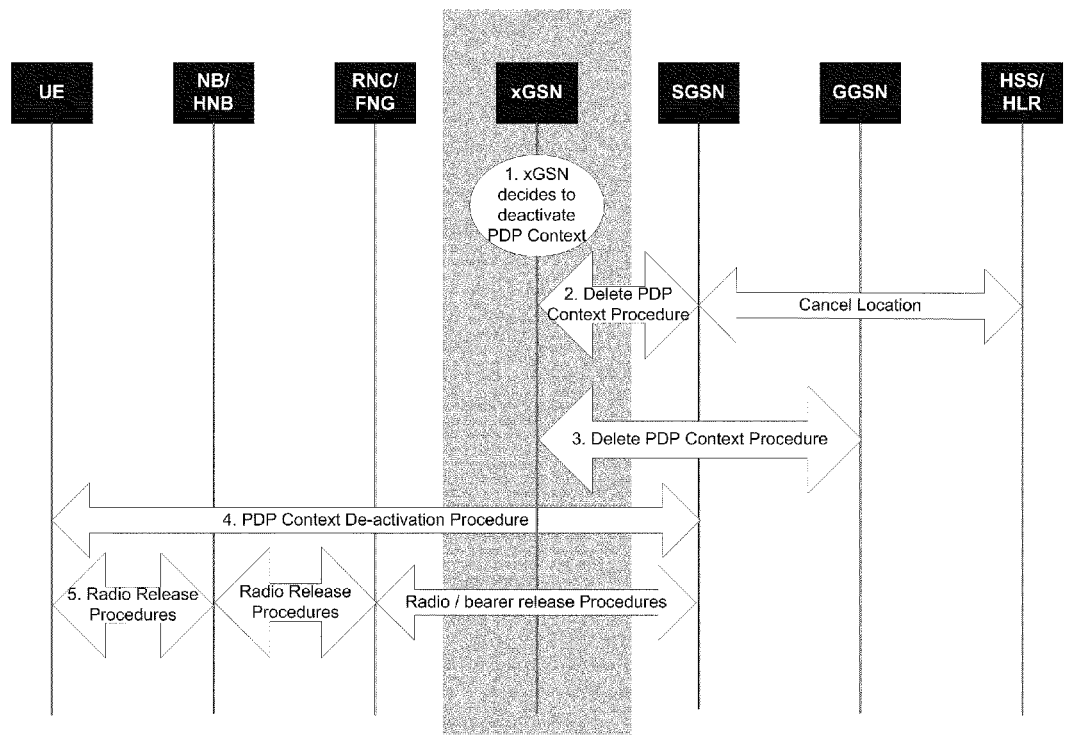
FIG. 4 is a call flow diagram of Session Termination by xGSN in accordance with certain embodiments.

FIG. 4 illustrates session termination by xGSN in accordance with certain embodiments. This procedure is based on standard call flow where a combination of the GGSN and SGSN initiate PDP context de-activation procedures. In step 1, de-activation begins after the xGSN decides to de-activate the PDP contexts for a given UE for any reason. One such reason can be a session termination message received from the PCRF due to policy reasons. In response, in step 2, the xGSN sends a Delete PDP Context Request message to the SGSN to trigger PDP context deactivation. The SGSN initiates the deactivation procedure, and in this process may contact the HSS/HLR to cancel the location for this UE. The SGSN replies back to xGSN with Delete PDP Context Response. In step 3, the xGSN sends a Delete PDP Context Request message to the GGSN to prompt it to release the PDP context and the PDP address(es). The GGSN replies back with Delete PDP Context Response. In step 4, the SGSN initiates PDP Context Deactivation procedures with the UE. In step 5, the UE, the RAN, and the SGSN perform Radio Resource (bearer) release procedures as per the standard.

Figure 5:
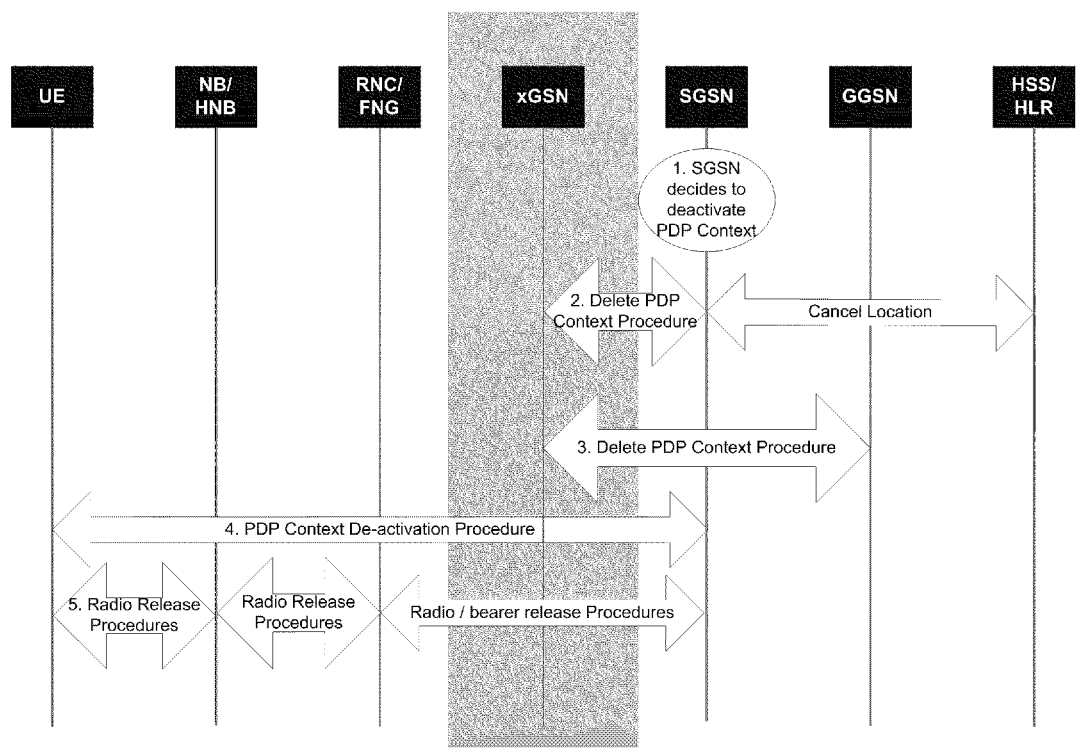
FIG. 5 is a call flow diagram of Session Termination by SGSN in accordance with certain embodiments.

FIG. 5 illustrates session termination by SGSN in accordance with certain embodiments. This procedure is based on a standard call flow where a combination of GGSN and SGSN initiated PDP context de-activation procedures. In step 1, the SGSN decides to de-activate the PDP contexts for a given UE for any reason. It may also be prompted by the HSS/HLR. In that case, this is a HSS/HLR initiated detach or de-activation procedure. In step 2, the SGSN sends a Delete PDP Context Request message to the xGSN to trigger PDP context deactivation. The SGSN may contact the HSS/HLR to cancel the location for this UE. The xGSN replies back to SGSN with a Delete PDP Context Response. In step 3, the xGSN sends a Delete PDP Context Request message to the GGSN to prompt it to release the PDP context and the PDP address(es). The GGSN replies back with Delete PDP Context Response. In step 4, the SGSN initiates PDP Context Deactivation procedures with the UE. In step 5, the UE, the RAN, and the SGSN perform Radio Resource (bearer) release procedures as per the standard.

Figure 6:
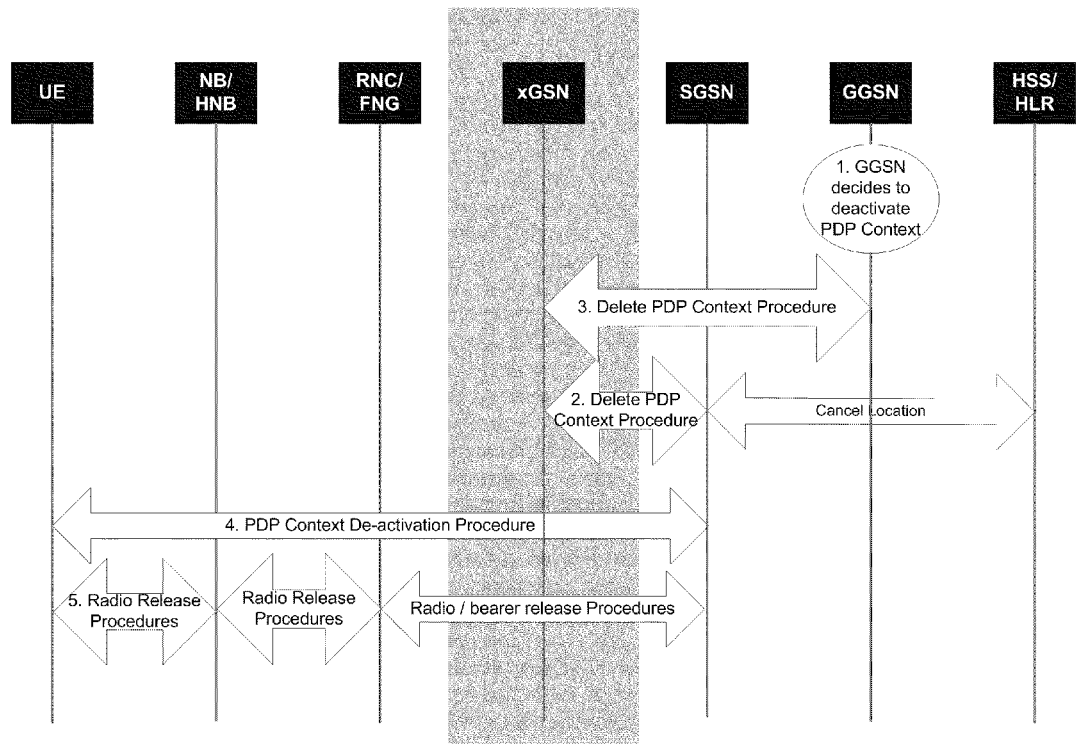
FIG. 6 is a call flow diagram of Session Termination by GGSN in accordance with certain embodiments.

FIG. 6 illustrates session termination by GGSN in accordance with certain embodiments. This procedure is based on the standard call flow where a combination of the GGSN and SGSN initiates PDP context de-activation procedures. In step 1, the GGSN decides to de-activate the PDP contexts for a given UE for any reason. It may also be prompted by the PCRF. In that case, this is a PCRF initiated detach or de-activation procedure. In step 2, the GGSN sends a Delete PDP Context Request message to the xGSN to trigger PDP context deactivation. The xGSN replies back to SGSN with a Delete PDP Context Response. In step 3, the xGSN sends a Delete PDP Context Request message to the SGSN to prompt it to release the PDP context and the PDP address(es). The SGSN may contact the HSS/HLR to cancel the location for this UE. The SGSN replies back with Delete PDP Context Response. In step 4, the SGSN initiates PDP Context Deactivation procedures with the UE. In step 5, the UE, the RAN, and the SGSN perform Radio Resource (bearer) release procedures as per the standard.

Figure 7:
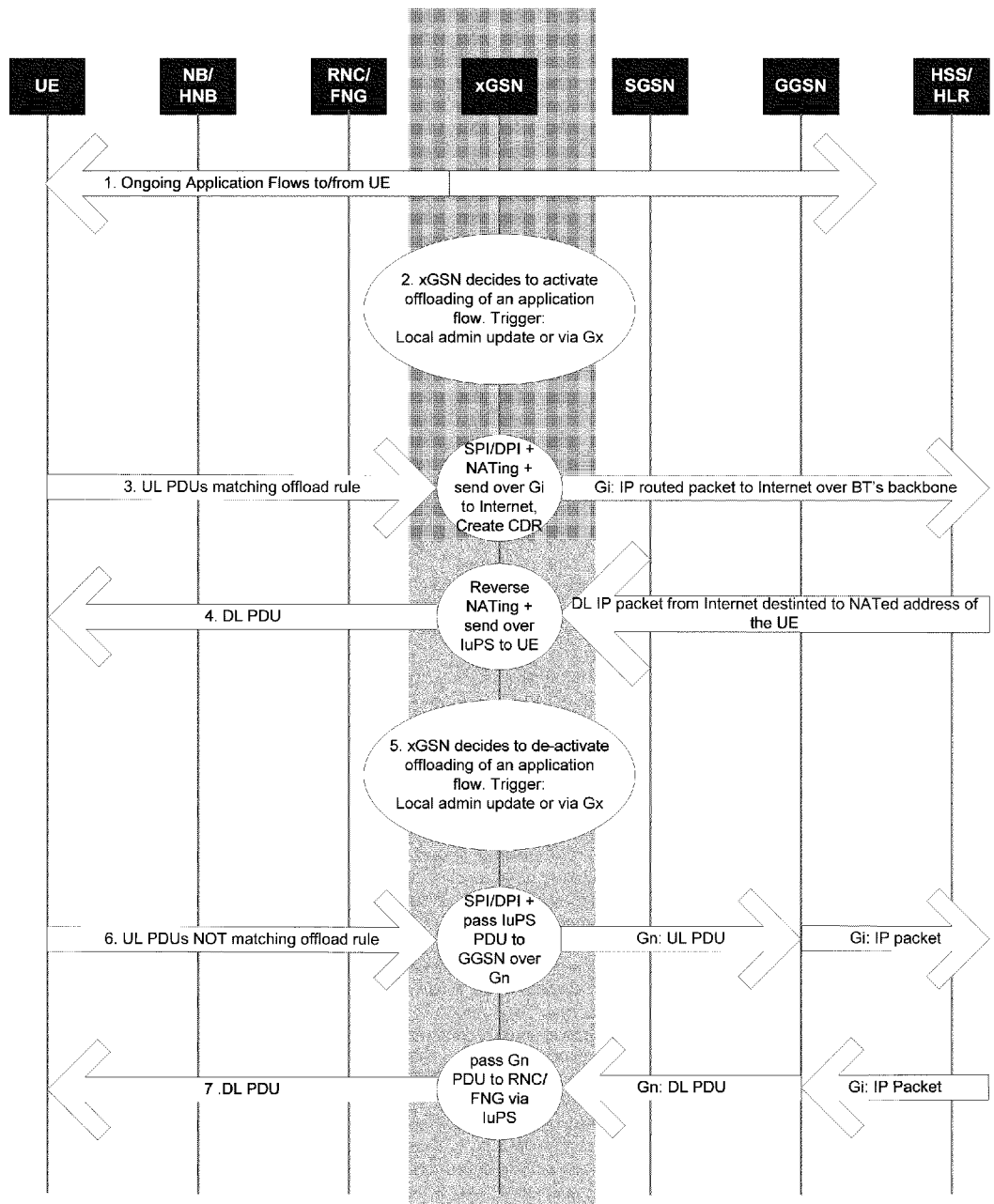
FIG. 7 is a call flow diagram of Dynamic Activation and De-activation of Offloading in accordance with certain embodiments.

FIG. 7 illustrates dynamic activation and de-activation of offloading in accordance with certain embodiments. In the call flow of FIG. 7, it is assumed that the UE has an ongoing PDP context with the network and the xGSN is on the path as established (as described in FIG. 2). In step 1, the UE is sending and receiving application flows via the established PDP context. In step 2, the xGSN decides to update the rule set to apply an offloading rule on an application flow. This can be done via the admin interface to the offloading gateway (e.g., the xGSN) or via Gx interface from PCRF. In step 3, the uplink (UL) packets arrive at the xGSN from the UE that matches newly installed/updated offloading rules. The xGSN begins the offloading operation on this packet as detailed in FIG. 2. The packet data can be inspected using shallow packet inspection/deep packet inspection, those meeting the criteria for offloading may undergo translation (e.g., NAT), and are then sent over the internet. The sending over the internet can be over the Gi interface. After a packet is offloaded, a call detail record (CDR) can be created or modified in the xGSN. NOTE: If this was an ongoing application, applying an offloading rule that includes NATing, may disrupt the application session due to insertion of NATted address/port in the middle of the application session. Therefore, it is advisable to apply offloading rule when the application session resumes next time.

In step 4, after the offloading of the application flow begins, the downlink (DL) packets corresponding to the offloaded application flow arrive directly over Gi interface to the xGSN. The xGSN forwards the packets to the UE following the procedure as detailed in FIG. 2. For example, the xGSN performs a reverse translation on the packet and sends it over the access network to the UE. In step 5, after some amount of time, the xGSN decides to de-activate offloading rules on an application flow. This can be done via admin interface or via Gx interface from the PCRF. As a result of the de-activate in step 6, the UL packets that arrive at the xGSN from the UE do not match offloading rules in the rule set due to the update in step 5. The xGSN forwards the packets over the Gn interface as detailed in FIG. 2. The same caveat applies here with respect to the removal of NAT rules on an ongoing application session. This may disrupt the application session. It is therefore advisable to apply new offload rules only when the application flow resumes next time. In step 7, the DL packets received over the Gn interface are forwarded to the UE as described in FIG. 2.

Figure 8:
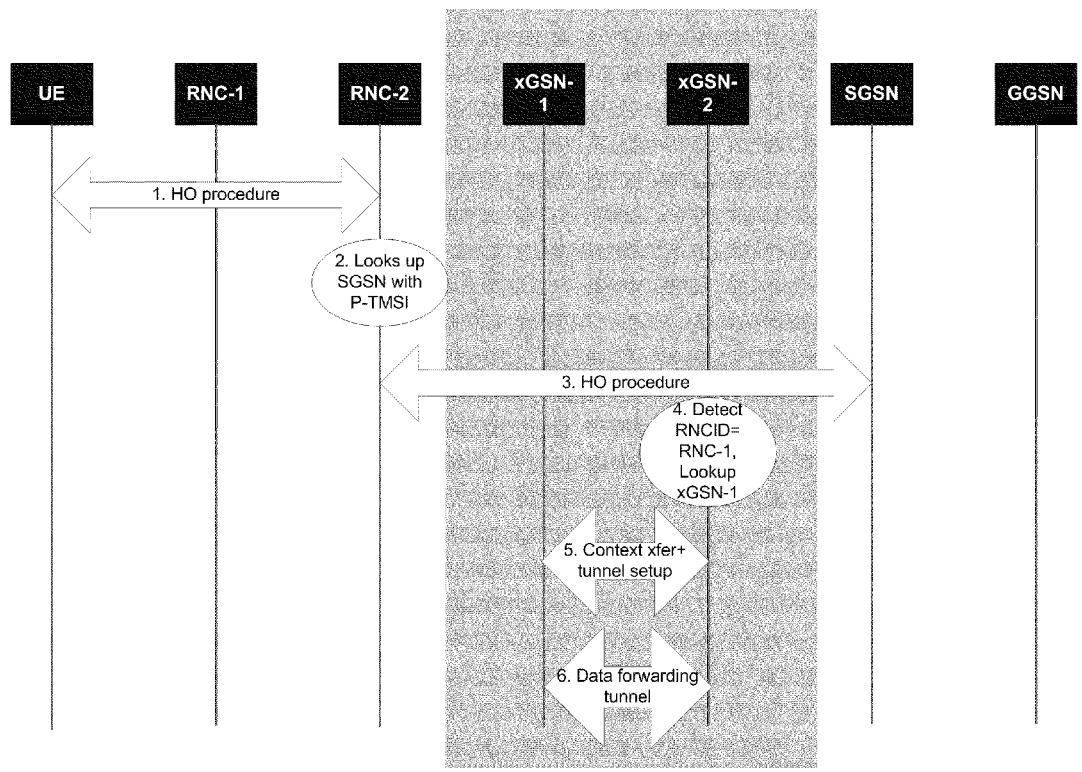
FIG. 8 is a call flow diagram of Inter-RNC Handover with xGSN change and with Anchored xGSN in accordance with certain embodiments.

FIG. 8 illustrates an Inter-RNC Handover with a xGSN change in accordance with certain embodiments. In this scenario, the UE is in active mode and moves to a new NodeB (NB) which is connected to a different RNC. In moving to the different RNC, a different xGSN is used for offloading because the different xGSN is on the path for the new IuPS connection with the RNC. In step 1 of this scenario, the UE performs PS handover procedure, e.g., as described in TS 43.129. In step 2, the RNC-2 routes the session to SGSN based on P-TMSI/RAI lookup. In step 3, the RNC-2 continues PS handover signaling with the SGSN. In step 4, the xGSN-2 detects that the handover signaling for the UE (P-TMSI) through detection of the radio network controller identification (RNCID) of RNC-1. The detection can occur through inspection the IuPS packets. The xGSN-2 then maps the RNCID to xGSN-1 using an internal preconfigured mapping table.

After the detection and mapping, the xGSN-2 performs Context Transfer and Tunnel setup procedure with the xGSN-1, in step 5. Since this example is of an Anchored xGSN scenario, the context transfer between the xGSNs may only contain basic session info. At the end of this step, there can be GTP-U tunnels setup between the xGSNs per IuPS-U to carry UL/DL packet data units (PDUs) between the nodes. In step 6, the bi-directional GTP-U tunnels are established between the xGSNs, and data traffic can flow between these nodes via these tunnels.

Figure 9:
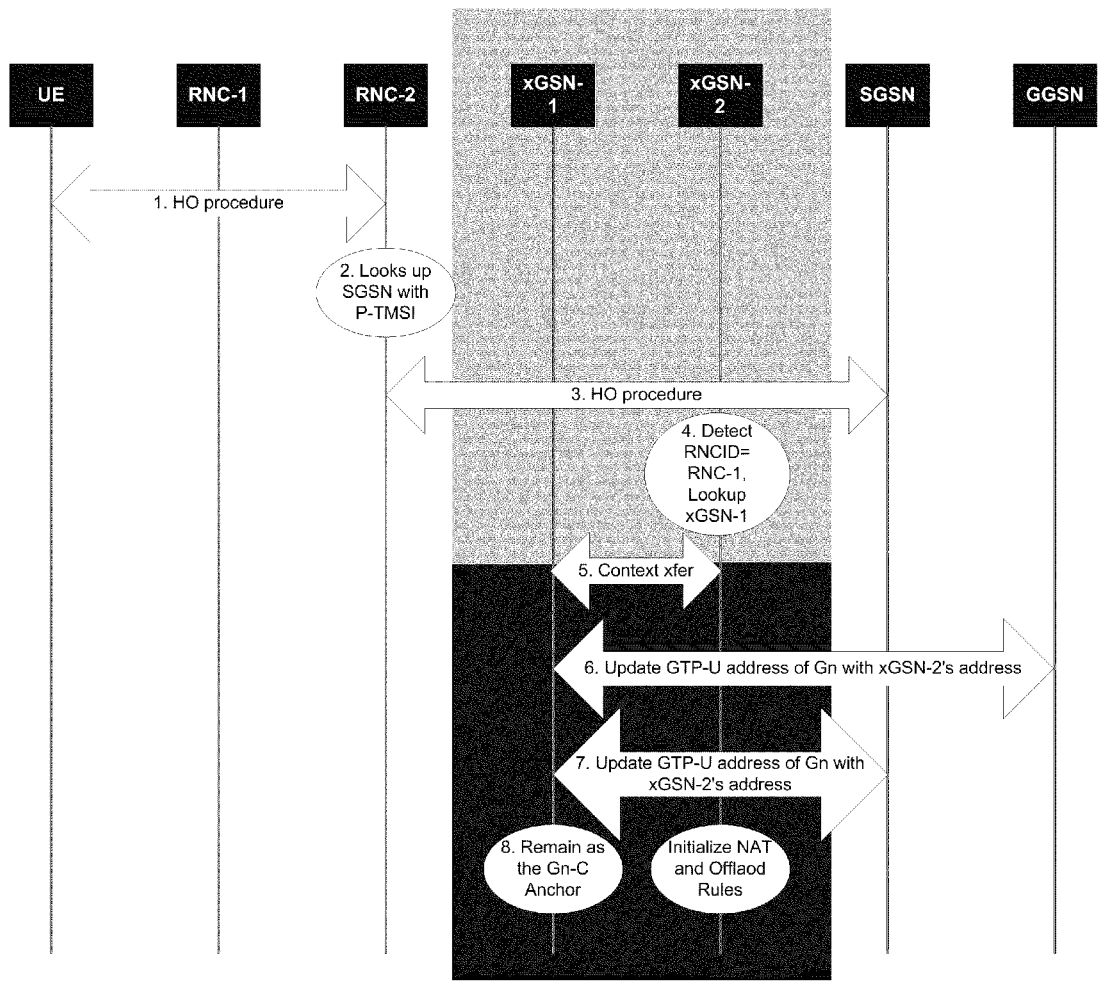
FIG. 9 is a call flow diagram of Inter-RNC Handover with xGSN U-Plane Relocation in accordance with certain embodiments.

FIG. 9 illustrates Inter-RNC Handover with xGSN User-Plane Relocation in accordance with certain embodiments. In this scenario, the inter-RNC handover also involves relocation of the xGSNs. However, instead of anchoring the whole session in the old xGSN, this scheme allows relocation of the user plane (U-Plane). The control plane (C-plane) remains anchored in the old xGSN. In implementing this scheme, steps 1-4 can be performed as described in FIG. 8. In step 5, the new xGSN, xGSN-2, executes a context transfer procedure with the old xGSN, xGSN-1, to transfer the U-plane context for the UE's PDP context (including any NAT state and Offload rule sets). The GTP-U bi-directional tunnels may be established at this step to ensure data forwarding for transient packets. If so, the GTP-U tunnels can be implicitly or explicitly torn down after the handover procedure is complete. In step 6, the xGSN-1 sends an update PDP context request message to GGSN to indicate that the U-plane address for Gn/Gp interface (xGSN-1-GGSN) has moved to xGSN-2's IP address. The GGSN responds after updating the PDP context accordingly. In step 7, the xGSN-1 also sends another update PDP context request message to SGSN to indicate that the U-plane address for Gn/Gp interface (xGSN-1-SGSN) has moved to xGSN-2's IP address. The SGSN responds after updating the PDP context accordingly.

In step 8, the xGSN-1 remains as the Gn-C Anchor for the session. It does not remain On-Path as far as IuPS is concerned. The xGSN-2 takes over as the U-Plane function and it is On-Path for the IuPS. xGSN-2 begins to apply offloading and NAT rules on the ongoing PDP session. One of the challenges with this scenario is the movement of NAT. In this scenario, the NAT function moves to xGSN-2 which will have to re-initialize the NAT states for ongoing offloaded application flows. This can disrupt the ongoing application flows.

Figure 10:
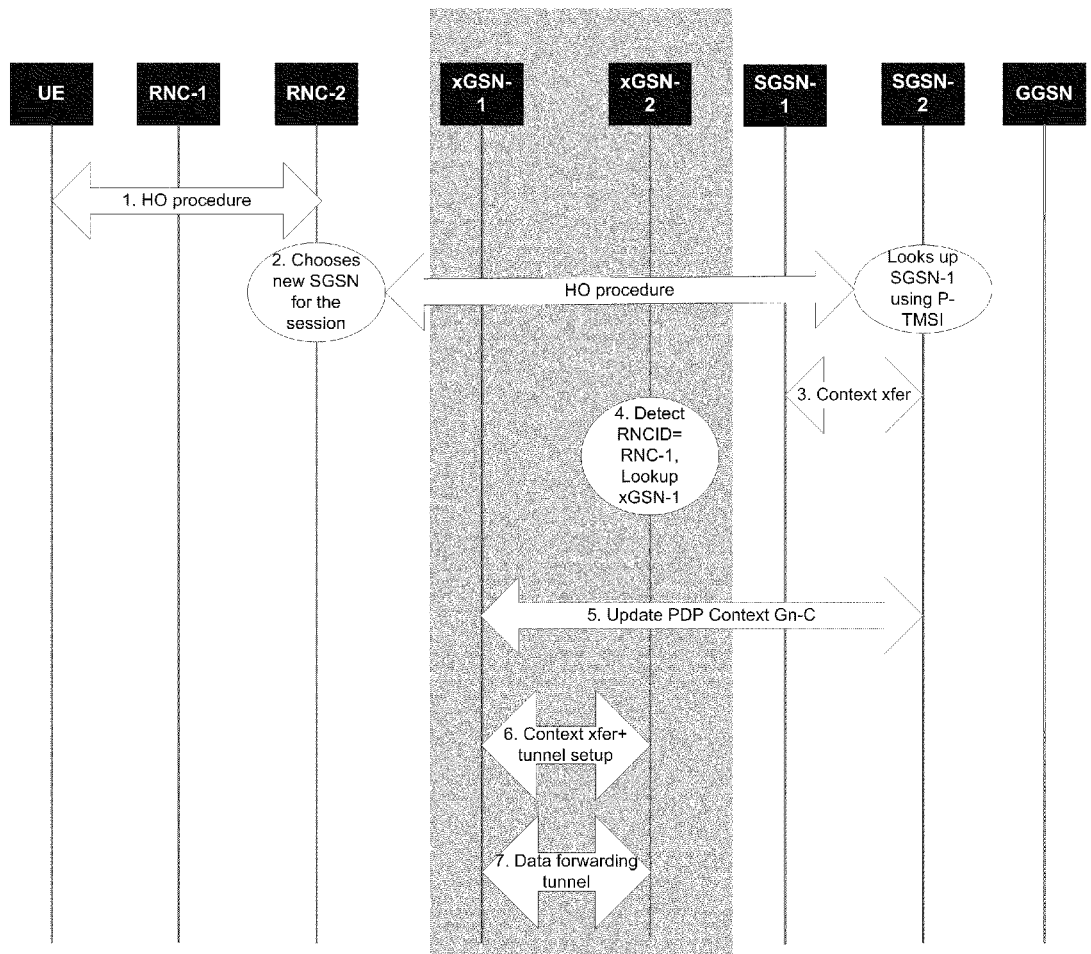
FIG. 10 is a call flow diagram of Inter SGSN Handover in accordance with certain embodiments.

FIG. 10 illustrates an Inter-SGSN Handover in accordance with certain embodiments. In this scenario, the new RNC chooses a new SGSN to handle the handover. This triggers an inter-SGSN handover. In step 1, the UE performs a packet switched (PS) handover procedure (e.g., as described in TS 43.129). In step 2, the RNC-2 routes the session to SGSN-2. This can occur because SGSN-1, based on P-TMSI/RAI lookup, may not be reachable from this RNC. Once SGSN-2 receives the session, SGSN-2 looks up SGSN-1 using the received P-TMSI/RAI. In step 3, SGSN-2 performs context transfer for the UE's context from SGSN-1. In step 4, the xGSN-2 detects that the handover signaling for the UE (P-TMSI) through detection of the RNCID of RNC-1 by inspecting the IuPS packets. The xGSN-2 can then map the RNCID to xGSN-1 using an internal preconfigured mapping table. In step 5, based on the transferred context information, SGSN-2 performs an update PDP context procedure with xGSN-1. In step 6, the xGSN-2 performs a context transfer and tunnel setup procedure with the xGSN-1. Since this example is of an anchored xGSN scenario, the context transfer between the xGSNs may only contain basic session information. At the end of this step, GTP-U tunnels can be setup between the xGSNs per IuPS-U to carry UL/DL PDUs between the nodes. In step 7, the bi-directional GTP-U tunnels are established between the xGSNs and data traffic can flow between these nodes via these tunnels.

Figure 11:
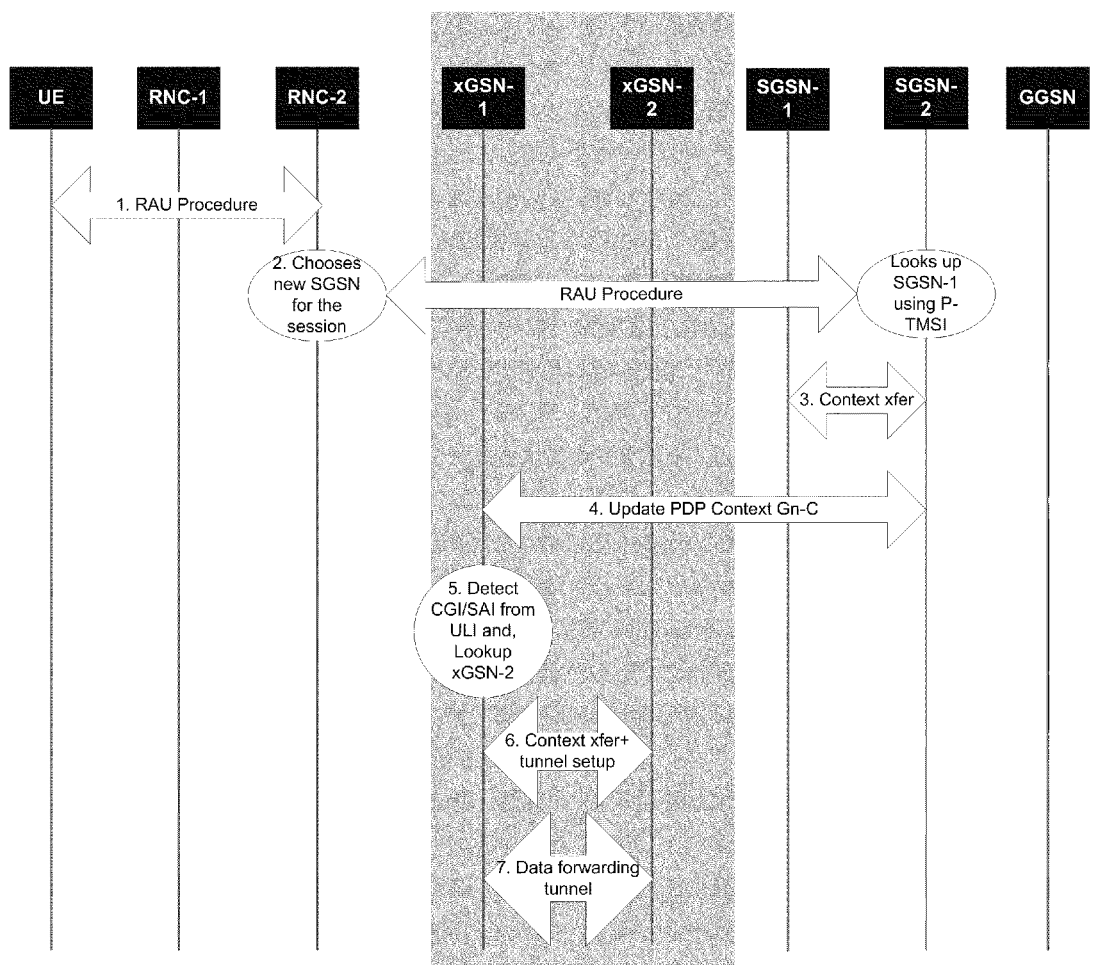
FIG. 11 is a call flow diagram of Routing Area Update with inter-SGSN Relocation in accordance with certain embodiments.

FIG. 11 illustrates a routing area update with inter-SGSN relocation in accordance with certain embodiments. In this scenario, the UE performs a Routing Area Update (RAU) which triggers an inter-SGSN relocation as well. In step 1, the UE initiates a routing area update. In step 2, the RNC-2 chooses a new SGSN (SGSN-2) since it cannot reach SGSN-1. The RAU procedure continues with SGSN-2 looking up SGSN-1's address using a P-TMSI/RAI, for example. In step 3, SGSN-2 performs a context transfer procedure with SGSN-1. In step 4, the SGSN-2 performs an Update PDP Context procedure with xGSN-1. In step 5, based on the CGI/SAI/SAC information in the ULI IE, the xGSN-1 derives the xGSN-2's address. In step 6, the xGSN-2 performs a context transfer and tunnel setup procedure with the xGSN-1. Since this example is of an anchored xGSN scenario, the context transfer between the xGSNs may only contain basic session info. At the end of this step, there are GTP-U tunnels setup between the xGSNs per IuPS-U to carry UL/DL PDUs between the nodes. In step 7, the bi-directional GTP-U tunnels are established between the xGSNs and data traffic can flow between these nodes via these tunnels.

Figure 12:
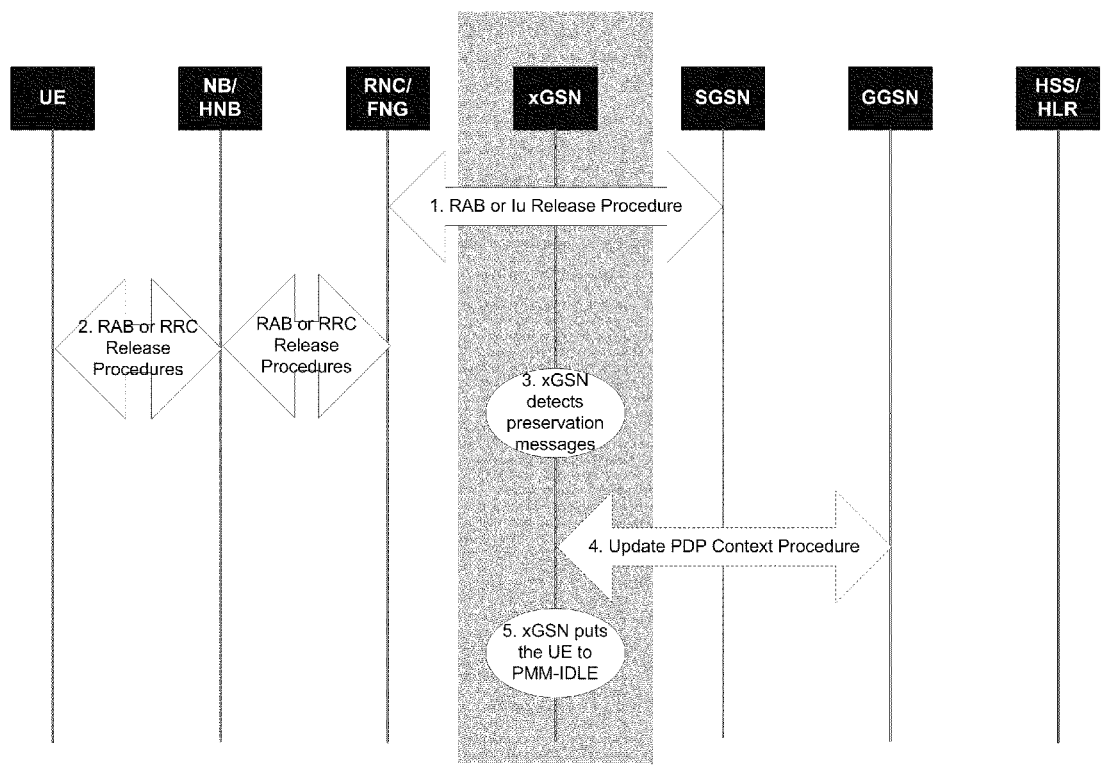
FIG. 12 is a call flow diagram of RAB and Iu Release Preservation Procedures in accordance with certain embodiments.

FIG. 12 illustrates radio access bearer (RAB) as well as Iu release preservation procedures in accordance with certain embodiments. In step 1, the RNC initiates RAB or Iu release procedures. In step 2, the RAB or radio resource control (RRC) release procedures take place over the air (i.e., wirelessly) between the RAN and the UE. In step 3, the xGSN detects the preservation transactions for the UE. In step 4, if direct tunnel is used, the SGSN also executes an Update PDP Context procedures with the xGSN. This can serve as an alternative for the xGSN to discover about the preservation procedure for the UE. In step 5, based on steps 3 and/or 4, the xGSN puts the UE's state to PMM-IDLE. In a PMM-idle state, the UE is paged by the mobility management gateway, such as the SGSN or mobility management entity (MME), in order to send or receive data.

Figure 13:
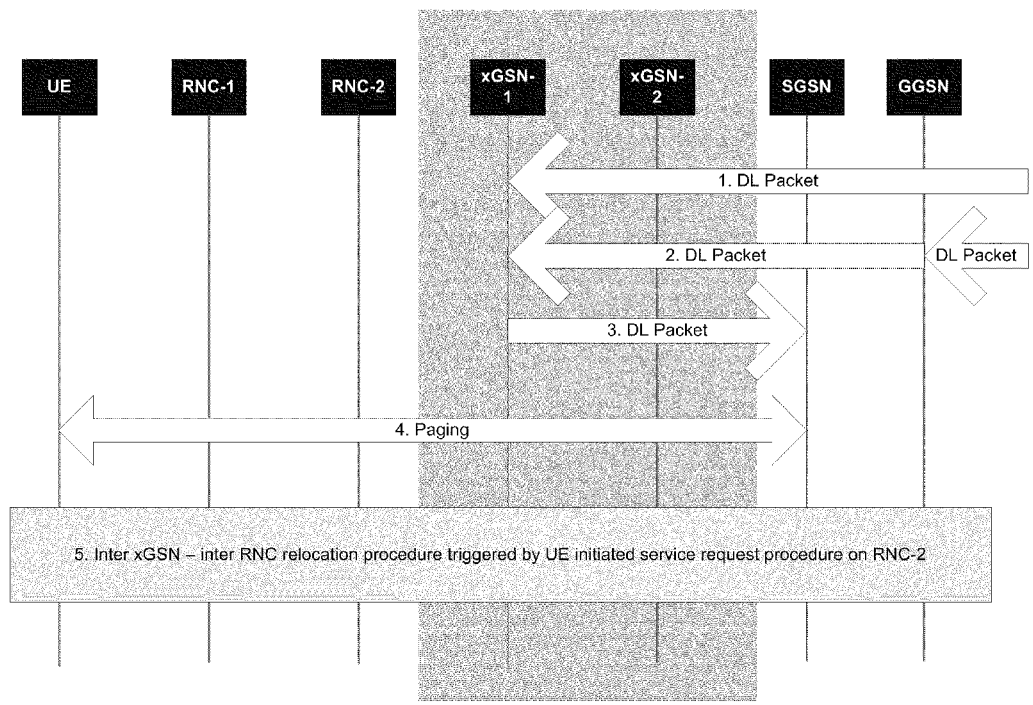
FIG. 13 is a call flow diagram of Network Requested Service Request and Paging in accordance with certain embodiments.

FIG. 13 illustrates network requested service request and paging in accordance with certain embodiments. In this scenario, the UE is in PMM-IDLE UE when it receives a DL packet. The packet is received at the xGSN-1, for example, 1) directly from the internet, 2) from an IP domain, or 3) at the GGSN. In step 1, a DL packet is received for a PMM-IDLE state UE directly at the xGSN-1. Alternatively in step 2, a DL packet is received for a PMM-IDLE state UE at the GGSN. The GGSN forwards the DL packet to the xGSN-1. In step 3, the xGSN-1 has knowledge of the UE's PMM-IDLE state, and it forwards the DL packet to the SGSN. In step 4, upon receiving the DL packet from xGSN-1, the SGSN begins paging procedure towards the UE. In step 5, assuming the UE responds to the page from a different RAN with different RNC, the UE initiated service request procedure is executed as per the standard. This also uses inter-xGSN and inter-RNC relocation procedures described herein.

After the UE has successfully performed the service request and RABs are established, the SGSN forwards the DL packets to the UE. In case of inter xGSN relocation, this DL packet traverses directly from the SGSN to the UE via the new xGSN. To charge for this packet, the xGSN-1 updates the G-CDR at step 3. After successful RAB establishment in the new RAN, the new xGSN (xGSN-2) sends a trigger to xGSN-1 informing it that the UE is no longer in PMM-IDLE state so that xGSN-1 stops forwarding DL packets to the SGSN. Instead it forwards DL packets directly to the xGSN-2. Alternatively, if direct tunnel is used at the SGSN, the SGSN sends PDP context update messages to the xGSN-1 to inform it about UE's transition out of PMM-IDLE state.

The offload logic and internal mapping tables can be implemented in software using a computer readable medium such as a programmable read only memory (PROM) or flash memory. The logic may also be implemented in hardware using an application specific integrated circuit (ASIC), programmable logic array (PLA), or any other integrated circuit. The logic and mapping table can be implemented using registers in a combination of hardware or software, or in microcode, for example. The registers can be used to implement databases that are processed using a processor such as a network processing unit.

LTE Based Offload

Figure 14:
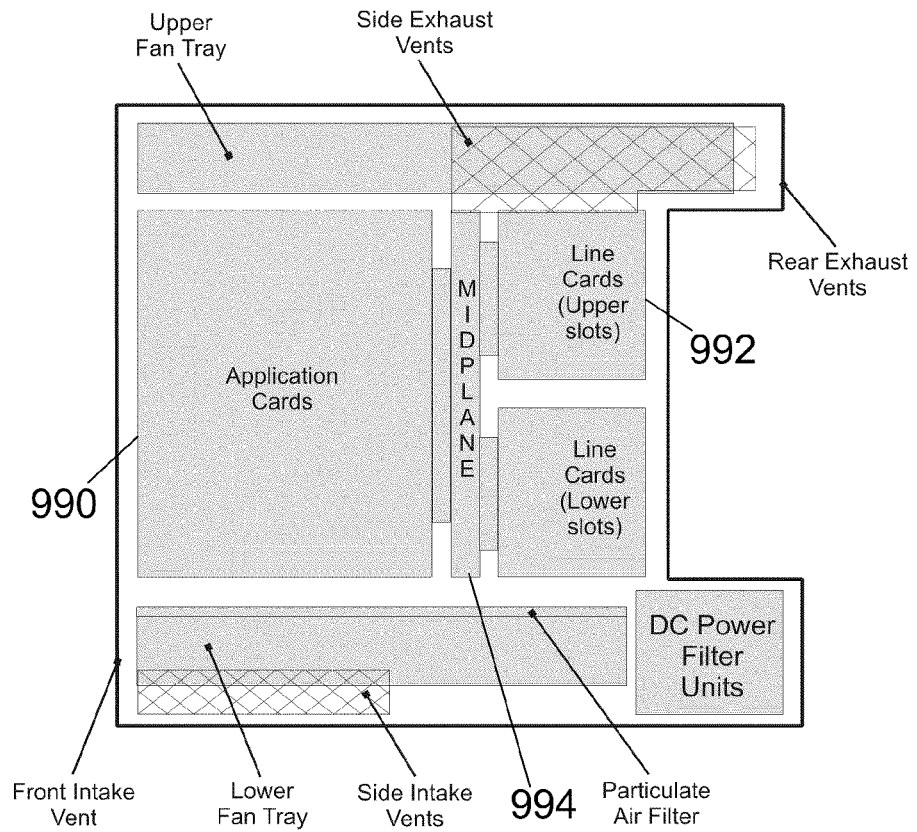
FIG. 14 is a block diagram of a communication system in accordance with certain embodiments.

The traffic offload solution for long term evolution (LTE) or 4G network can be achieved using an offload gateway, which can be implemented in a gateway such as an xGW. FIG. 14 illustrates an LTE communication network with an offload gateway in accordance with certain embodiments. FIG. 14 includes user equipment (UE) 110, a evolved NodeB (eNB) 212, a home eNodeB (HeNB) 214, a mobile backhaul network 216, a broadband network 218, an Internet 120, an Offload Gateway (O-GW) 222, a mobility management entity (MME) 224, a packet data network gateway (PGW) 226, a Lawful Interception Gateway (LIG) 128, a Charging Gateway Function/Online Charging System (CGF/OCS) 130, a Policy and Charging Rules Function (PCRF) 132, and a Home Subscriber Server (HSS) 134. As shown, Offload gateway 222, which can be implemented on a gateway device, can include a Network Address Translation (NAT) functionality 238 and a Femto Network Gateway (FNG) 240 among other things. The offload gateway 222 can be used to interwork and interconnect with a HeNB 214 from the femto network, an eNodeB 212 from the LTE network, a MME 224 and PGW 226 on the operator's network, the Internet 120, LIG 128, CGF 130, and PCRF 132.

The offload gateway 222 can be deployed at the S1-U interface geographically close to the eNB 212, which can save the cost of backhauling the traffic on the operator's access network. The offload gateway 222, in addition to providing offload functionality, can also provide paging, charging and lawful interception functions. The offload gateway can implement bearer plane packet inspection with specific and select control plane packet inspection. The offload gateway can be used with different access networks technologies, e.g., with 2G, 2.5G, 3G (e.g., UMTS), and 4G (LTE-SAE). The offload gateway can be implemented as an SGW (denoted as SGW-xGW) and a PGW (denoted as PGW-xGW) in some embodiments. The SGW-xGW can perform a number of functions. On function includes behaving as a standard SGW towards the home PGW at the time of UE attach, in order to establish a PDN connection that results in IP connectivity. Another function includes programming the traffic rules to identify the traffic to offload to the Internet and the traffic to route to the home network. Yet another function is to establish an internal session with the PGW-xGW in order to forward traffic selected for offload.

The SGW-xGW can act as an intelligent traffic multiplexer and a demultiplexer for the Internet and Home traffic. The PGW-xGW can be a PGW which performs a NAT operation on traffic received from the SGW-xGW and a reverse NAT operation on traffic received from the Internet. This NAT operation can be performed in order to send and receive traffic to and from the Internet based on the xGW's IP network topology. When there is handover from a base station to another base station that requires xGW relocation, the PGW-xGW can act as an anchor for Internet traffic while forwarding Home traffic to the SGW-xGW. In this case, the PGW-xGW acts as a traffic multiplexer and demultiplexer for handover sessions. In some embodiments, the xGW is a specialized node that performs traffic offload to the Internet using sophisticated rules, while seamlessly co-existing with the other elements in the LTE/SAE architecture.

Figure 15:
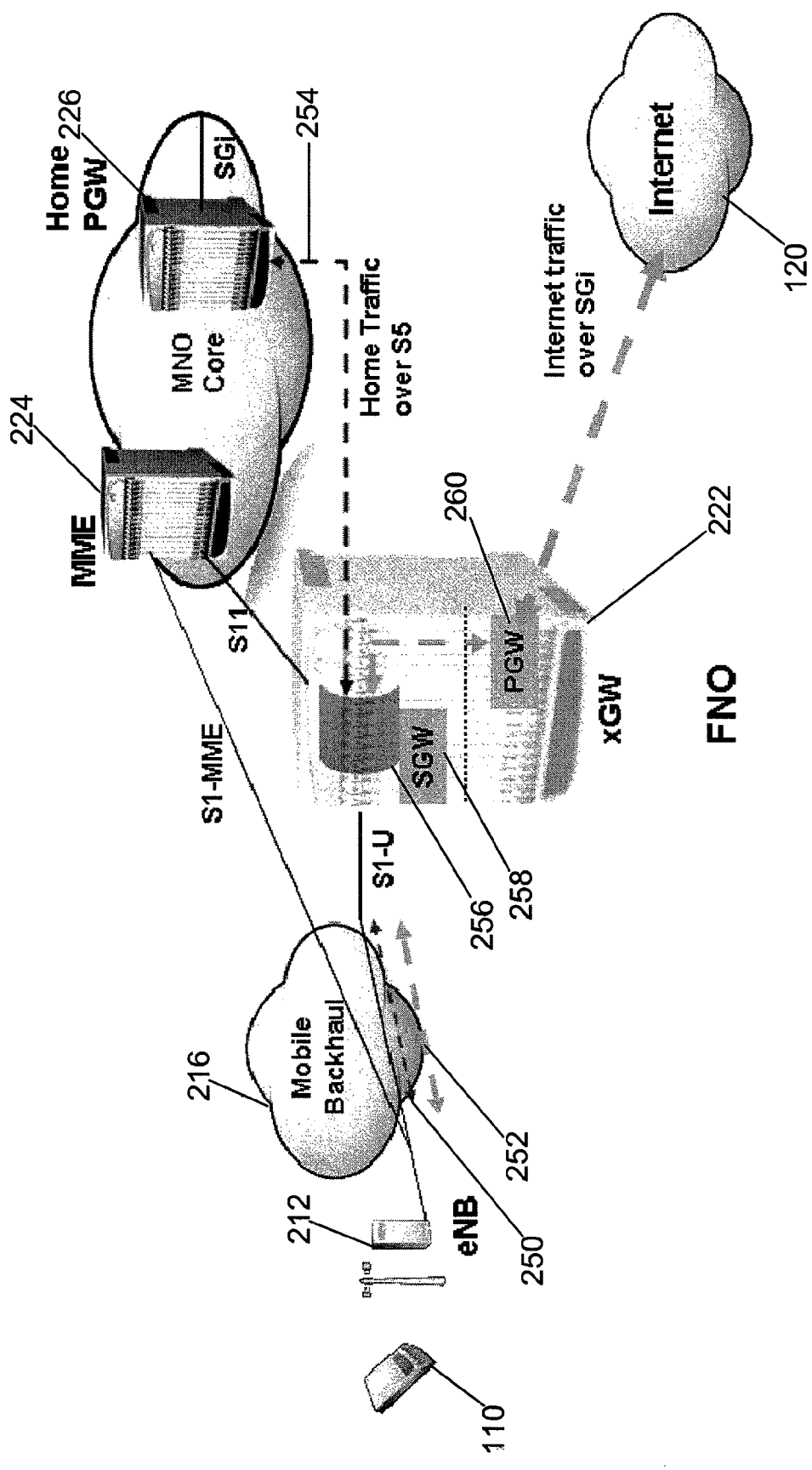
FIG. 15 is a block diagram illustrating offloading at an offload gateway in accordance with certain embodiments.

FIG. 15 illustrates operation of an offload gateway in some embodiments. In operation, the user equipment 110 can communicate with eNB 212 wirelessly though an radio interface. The eNB 212 can convert the wireless communication to wired-based communication over a communication network. The communications between the UE 110 and eNB 212 include access network traffic and Internet traffic. The access traffic can include control information, voice over IP (VoIP) packets, packetized voice, QoS-based data service, text messaging, and data sent or received from another mobile device. The Internet traffic includes data the originates or terminates on the Internet such as video, music, web content, or games. The Internet traffic is typically traffic that ends up being sent to the Internet after passing through the operator's core packet network. A traffic rules function 256 includes traffic rules that are used to identify the traffic that is offloaded to the Internet. The offload gateway 222 can also setup an internal session to forward selected traffic for offload. The traffic rules function 256 can be implemented in conjunction with an SGW function 258 and can communicate with a PGW 260. The traffic rules function 256, SGW function 258, and PGW 260 can be implemented as modules that are stored in whole or part in memory and are run on at least one processor. The implementation of offload gateway is further described below. The internal session can send the traffic to a PGW function that sends the traffic over an SGi interface to the Internet.

Figure 16:
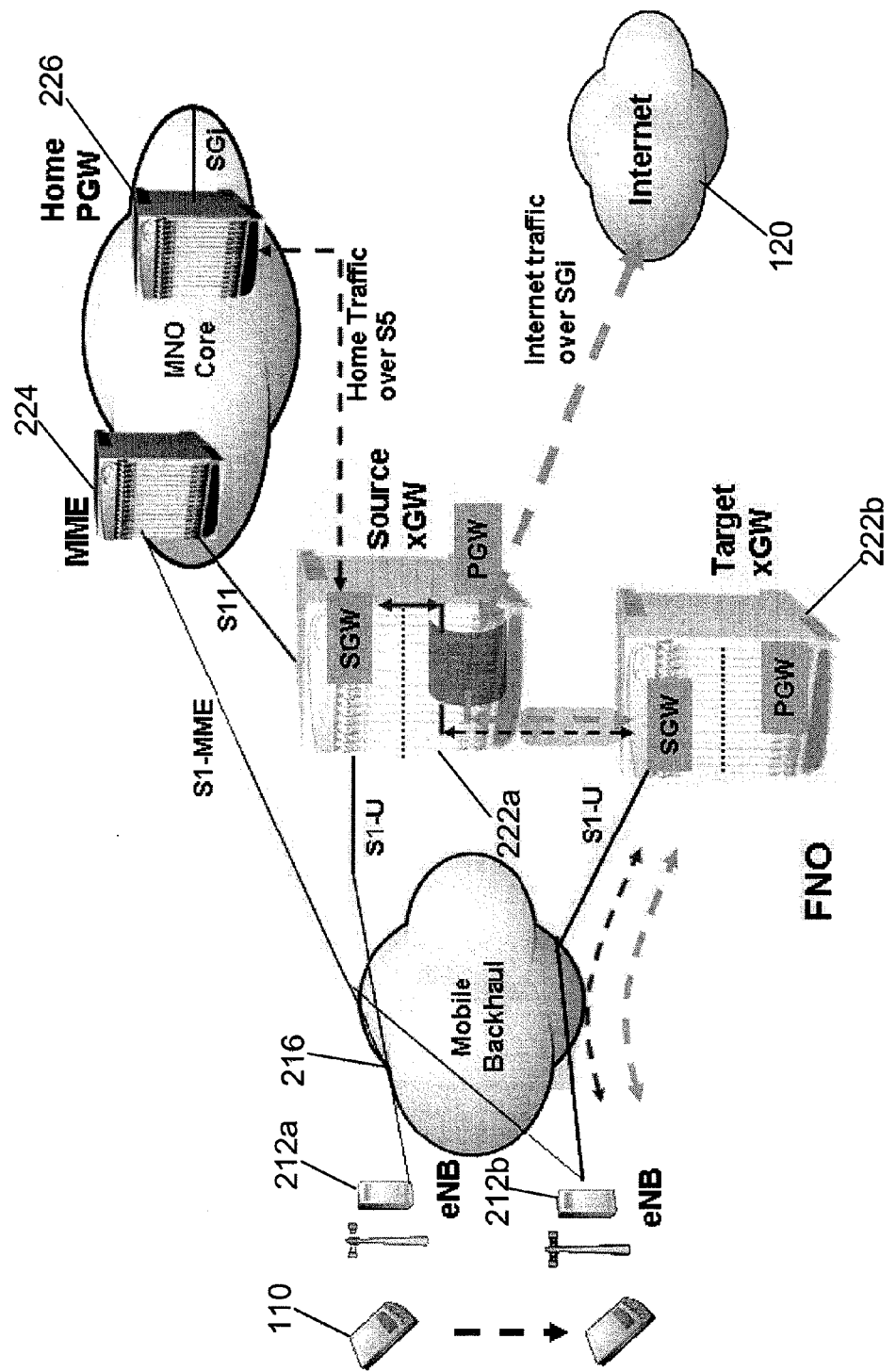
FIG. 16 is a block diagram illustrating a handover between offload gateways in accordance with certain embodiments.

FIG. 16 illustrates a handover from a first offload gateway to a second offload gateway in accordance with certain embodiments. As shown, UE 110 moves from the radio coverage of eNB 212a to the radio coverage of eNB 212b. In some embodiments, access network traffic and the Internet traffic can be tunneled between a target offload gateway 222b and source offload gateway 222a. The tunneling can be implemented to prevent any disruption in service when UE 110 is roaming. In some implementations, traffic can be re-directed between the source offload gateway 222a quicker than the establishment of sessions and communications within an offload gateway. While the access network traffic and Internet traffic are being tunneled between the source offload gateway 222a and the target offload gateway 222b, the target offload gateway 222b can setup the sessions to take over the offloading and offload determinations of the traffic. When offload gateway 222b is setup, the forwarding of the traffic between target gateway 222b and the source gateway 222a can be discontinued, and the target gateway 222b can handle the offloading of Internet traffic.

A number of features are implemented in the offload gateway. For example, the offload gateway provides seamless operation within the standard LTE EPC architecture. The offload gateway, xGW, does not introduce changes to the existing nodes in the LTE EPC architecture while providing the traffic offload service. This allows operators to introduce the offload service without having to disrupt the existing architecture or change the existing network topology to provide offloading functionality in the network. The offload gateway provides sophisticated operation at the flow granularity. The offload gateway can be configured using a Command Line Interface or programmed via a policy interface (PCRF) to selectively offload traffic (such as Youtube video) while forwarding other traffic (such as IMS multimedia) via the operators core network. An operator can specify exactly which kind of traffic is offloaded directly to the Internet and which kind of traffic is sent via the home network. The offload gateway can offload traffic without requiring new IP address or prefix pools. The offload gateway can operate on already assigned addresses or prefixes allowing operators to conserve address management and routing. At the same time, the offload gateway can provide IP pool management as well as specialized APN service if the operator so decides. The offload gateway can also provide transparent mobility management. In the LTE/SAE architecture, the MME manages the mobility of the User Equipment (UE). In some embodiments, the MME continues to manage the UE mobility without being aware of some traffic being offloaded to the Internet. The mobility of offloaded traffic is ensured by anchoring those sessions at the offload gateway, xGW. Information can be provided from the offload gateway to the MME to allow the MME to continue managing the mobility of the UEs.

In some embodiments, the xGW can be related to the other network nodes in the following way. From the perspective of the MME, the offload gateway can be an xGW that is a combined PGW and SGW. When xGW relocation happens due to, e.g., eNodeB handovers, the MME treats the xGW as an SGW. For notation, SGW-xGW can be to denote an SGW collocated with the xGW and PGW-xGW can be used to denote the PGW collocated with the xGW. In the collocated xGW, the MME selects this combined node based on APN configuration or PGW-FQDN configuration in the HSS on a per-subscriber basis. This allows an operator to configure the service at the time of user attachment to the network. The MME uses an S11 interface to communicate towards the SGW-xGW in the combined node. The MME provides the SGW-xGW's F-TEID for IP address and TEID to the eNB over S1-MME for bearer traffic. The MME manages the X2 and S1 interface mobility with the SGW-xGW. The MME manages idle mode mobility and paging with the SGW-xGW.

From PGW perspective for this combined offload gateway, the xGW is an SGW. The traffic that is not off-loaded can be sent by the xGW to the PGW over S5/S8. The PGW can receive S5/S8 control-plane signaling that is forwarded by the xGW. This can include, for example, ULI from the MME that may be sent to the PGW depending on the policy. If there is an xGW relocation, traffic continues to be anchored at the source xGW (which implies the relocation is transparent to the PGW). Alternatively, xGW relocation can also be treated as SGW relocation. From the perspective eNB, xGW is an SGW. The xGW can terminate the S1-U GTP-U tunnel carrying bearer traffic.

In some embodiments, the introduction of the xGW is transparent to the other elements in the EUTRAN and EPC. This transparency can be the result of providing internal functions and sessions to manage the mobility and process the data at the edge of the network. The mobility management and processing can allow offloading at the edge in a way that is non-disruptive to the existing network topology and does not require modification to other network devices in the network topology. For example, the offload gateway (xGW) can perform Network Address Translation (NAT) using the IP addresses assigned by the PGW for traffic which is offloaded to the Internet. For the traffic that is not offloaded, the offload gateway (xGW) can forward the traffic to the PGW just as an SGW would. The xGW may perform IP address assignment on its own in case of PDN connection termination by the xGW, i.e. S5/S8 connection to another PGW may not occur. In this case, there is no NAT required. The following sections describe the operation of the xGW for procedures such as attachment to the network, mobility in active and idle modes as well as detachment from the network.

The offload traffic rules logic and internal session can be implemented in software using a computer readable medium such as a programmable read only memory (PROM) or flash memory. The logic may also be implemented in hardware using an application specific integrated circuit (ASIC), programmable logic array (PLA), or any other integrated circuit. The logic and session can be implemented using registers in a combination of hardware or software, or in microcode, for example. The registers can be used to implement databases that are processed using a processor such as a network processing unit.

Figure 17:
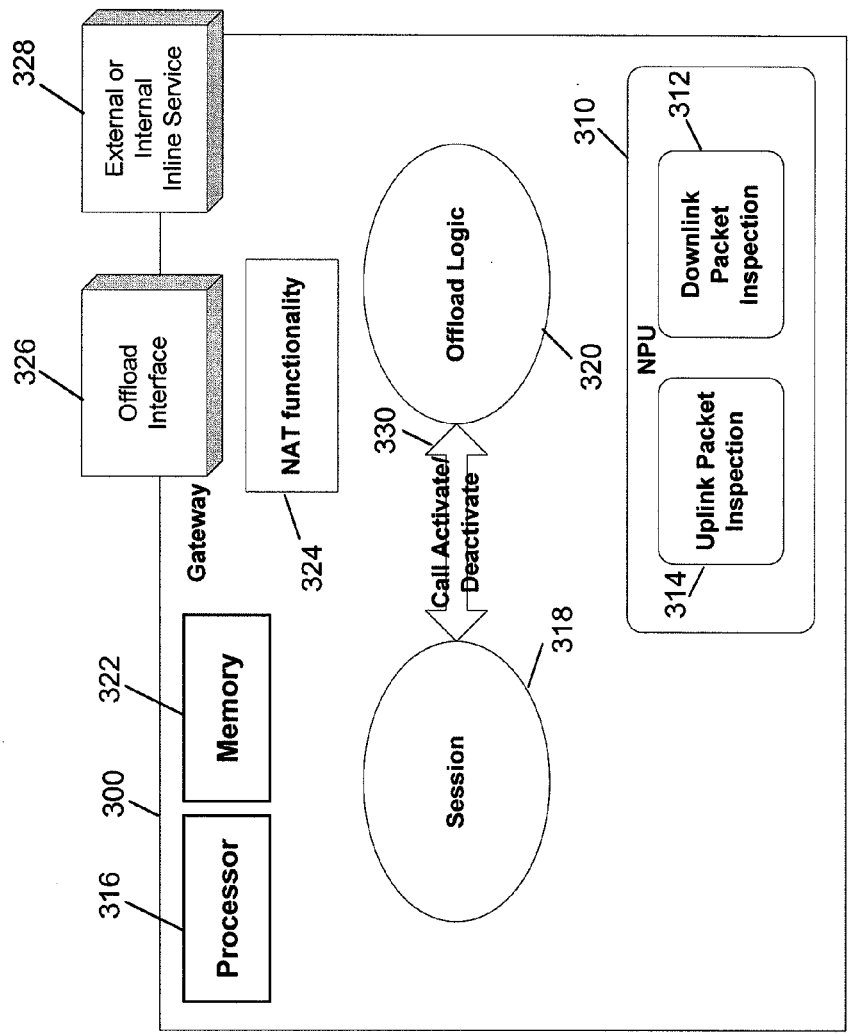
FIG. 17 illustrates logical offload gateway in accordance with certain embodiments.

FIG. 17 illustrates a logical view of an offload gateway that implements offloading in accordance with certain embodiments. The gateway 300 includes a network processing unit (NPU) 310, downlink packet inspection 312, uplink packet inspection 314, a processor 316, a session manager 318, an offload logic 320, a memory 322, a NAT functionality 324, an offload interface 326, and an external/internal inline service 328, and communication module 330. The processor 316 and memory 322 are used to provide session manager 318, offload logic 320 and NAT functionality 324. For example, session manager 318 can include information stored in memory 322 upon which action is taken by processor 316. In some embodiments, offload logic 320 can be implemented as a module that is a combination of hardware and software. Offload logic 320 includes data stored in memory 322 such as rules for analyzing packets, state information that is used in analyzing packets and preserving decision, and configuration information. Multiple offload logics 320 can be used in offload gateway 300. The offload logic can communicate with NPU 310 to setup packet directors for specific flows or packet types. The inspectors setup in NPU 310 can be filers or other rules implemented in any combination of hardware or software. In some case, the packet directors use shallow packet inspection to quickly sort and direct packets.

The packet inspectors in NPU 310 can monitor packets and direct packets (or information from the packets) to the proper module by checking packets for certain criteria and directing the packets based on the criteria. Typically, the packet inspectors in NPU 310 perform a limited inspection of the packet based on what is expected of packets in the flow or based on a certain category of packet. If the packet meets certain criteria, it is directed according to the proper module, which is typically an offload logic 320.

In the example of a real-time streaming protocol video stream, the RTSP requests are received by the gateway 300 at an interface. Session manager 318 can setup a offload logic 320 for this expected flow and can also setup a packet inspector in NPU 310 to direct packets to offload logic 320 for further analysis, modification, or redirection. Session manager 318 analyzes messages to activate and deactivate sessions, and if needed offload logic 320, in offload gateway 300. During the inspection of the messages by session manager 318, information is also obtained that can be used to setup the session, authenticate the session, and link the session to a subscriber profile. When a new session is activated, session manager 318 can authenticate the call to load the subscriber profile. The authentication can involve the NAI, the MSID, the user name and password, or any other authentication attribute of the user equipment. The subscriber profile includes configuration information such as the subscriber access control list (ACL), and other services applied for this subscriber. When the call is authenticated or authorized, then QoS can be setup on a per-session basis and the packet flow begins. The session manager may also authenticate the subscriber with a PCRF so the PCRF can send policy information and instructions regarding QoS and services to be provided to the subscriber's data. This information may impact whether traffic is offloaded. If the traffic is determined to be offloadable, then the packet flow is sent to NAT functionality 324, which sends it to offload interface 326. Offload logic 330 defines how packet flows are handled by offload gateway 300 based on the characteristics of the packets, which includes information in a packet header.

In providing offload of data, the offload logic includes analyzing and determining what traffic is eligible for offloading. The offload logic can use an analyzer to inspect and analyze packets received in a variety of protocols at the different layers of the open systems interconnection (OSI) stack. The offload eligibility module supports, inspects, and analyzes at least the following protocols: internet protocol (IP), internet message access protocol (IMAP), transmission control protocol (TCP), user datagram protocol (UDP), domain name system (DNS), file transfer protocol (FTP), trivial file transfer protocol (TFTP), simple mail transfer protocol (SMTP), post office protocol version 3 (POP3), hypertext transfer protocol (HTTP), internet control message protocol (ICMP), wireless access protocol (WAP), wireless transaction protocol (WTP), wireless session protocol (WSP), real-time protocol (RTP), real-time streaming protocol (RTSP), multimedia messaging service (MMS), session initiation protocol (SIP), session description protocol (SDP), and MSN Messenger.

The analyzer can be based on configured rules that may be static or dynamically provisioned. Rules used for traffic analysis analyze packet flows and form offload decisions. The analyzer performs shallow (Layer 3 and Layer 4) and deep (above Layer 4) packet inspection of the IP packet flows, depending on the packet and the rule for offloading. Shallow inspection includes examining, for example, the IP header (Layer 3) or UDP/TCP header (Layer 4), while deep packet inspection includes examining, for example, the Uniform Resource Identifier (URI) information (layer 7). The analyzer can also correlate layer 3 packets (and bytes) with higher layer trigger criteria (e.g. URL detected in a HTTP header) and also perform stateful packet inspection with complex protocols like FTP, RTSP, SIP that dynamically open ports for the data path. The shallow and deep packet inspection identify trigger conditions that are used in determining whether a packet or packet flow is eligible for offload.

In some cases, Layer 3 and 4 analyzers that identify a trigger condition are insufficient for offloading determination purposes, so layer 7 is used. For example, the web site www.companyname.com corresponds to IP address 1.1.1.1. Since all parts of this web site correspond to a destination address of 1.1.1.1 and port number 80 (http), the determination of offloadable user traffic may need to be through inspection of the actual URL (Layer 7). For example, a video about the company (www.companyname.com/video) is offloadable, but this information may not be available from shallow packet inspection to setup the offload. Deep packet inspection performs packet inspection beyond Layer 4 inspection and is typically deployed for detection of URI information at level 7 (e.g. HTTP, WTP, RTSP URLs) and the identification of true destination in the case of terminating proxies, where shallow packet inspection would only reveal the destination IP address/port number of a terminating proxy such as the operating company's WAP gateway. The gateway can also perform de-encapsulation of nested traffic encapsulation, e.g. MMS-over-WTP/WSP-over-UDP/IP, and verification that traffic actually conforms to the protocol the layer 4 port number suggests. The offload module has the ability to employ deep packet inspection if shallow packet inspection does not provide enough information on which to make an offload determination.

In providing inspection and offloading, rule definitions can be used to determine whether packets are eligible for offloading. Rule definitions (ruledefs) are user-defined expressions, based on protocol fields and/or protocol-states, which define what actions to take when specific field values are true. Expressions may contain a number of operator types (string, =, >, etc.) based on the data type of the operand. For example, "string" type expressions like URLs and hostname can be used with comparison operators like "contains", "!contains", "=", "!=", "starts-with", "ends-with", "!starts-with" and "!ends-with". Integer type expressions like "packet size" and "sequence number" can be used with comparison operators like "=", "!=", ">=", "<=". Each Ruledef configuration can include multiple expressions applicable to any of the fields or states supported by the respective analyzers. Each rule definition can be used across multiple rule bases and up to 1024 Ruledefs can be defined in some embodiments.

Rule definitions have an expression part, which matches particular packets based upon analyzer field variables. This is a boolean (analyzer_field operator value) expression that tests for analyzer field values. For example; http url contains cnn.com or http any-match=TRUE. The categories of ruledefs include routing ruledefs and offload ruledefs. The routing ruledefs are used to route packets to content analyzers. Routing ruledefs determine which content analyzer to route the packet to when the protocol fields and/or protocol-states in ruledef expression are true. Offload ruledefs are used to specify what action to take based on the analysis done by the content analyzers. Actions can include redirection, offloading, dropping, or normal forwarding, charge value, and billing record emission. Ruledefs are configurable through commands sent to the gateway. Ruledefs support a priority configuration to specify the order by which the ruledefs are examined and applied to packets.

The offload gateway can be implemented in a network device using a combination of hardware and software. In one embodiment, the offload gateway can be implemented as a service in a network device. There can be one offload gateway service per virtual private network (VPN) or context on the network device. The offload gateway service can be implemented in an operating system such as Linex. In UMTS mode, the offload gateway service provisions a GTPC and at least one GTPU IP address for use in offloading. The service starts depending on a successful binding of the provisioned IP addresses with the software functionality. After the binding, then instances of the service can be instantiated in the operating system. The first offload gateway service instance that is created causes a start of an offload gateway specific proclet (a lightweight process), the offload gateway manager (OGW-MGR). The offload gateway service instance configuration can be pushed to the session managers (sessmgrs) by a session control (sessctrl) function.

The offload manager provides a first point of entry for new control plane messages, such as PDP context request messages or session establishment messages. The offload manager assigns the incoming session establishment messages to a session manager if there is a criteria match in the offload logic.

In a UMTS embodiment, the offload gateway manager can be the first point of entry for new messages such as PDP contexts. The offload gateway manager can load balance new PDP requests to a session manager (sessmgr) if the PDP matches one of the top-level offloading criterion (APN/IMSI/IMEI/Location). The offload gateway manager can also work with the network processing unit (NPU) to setup flow directors that recognize and direct packets to the appropriate functionality in the offload gateway. In one embodiment, the offload gateway manager handles nodal GTPC messages for the offload gateway services that are servicing UMTS networks. The offload gateway manager sets up a GTPC flow director in the NPU corresponding to the GTPC addresses specified for each of these services for the TEID-C value of 0. The GTPC/GTPU messages that cannot be matched to a session in the sessmgr can be directed to the offload gateway manager. The offload gateway manager can be the default handler for such messages.

If the chassis is operating in a standalone mode, the offload gateway manager intercepts and parse IuPS control plane messages for RAB Assignments/Release, SRNS Procedures, RAU Procedures, and any other session establishment messages. In this case, the RNC and SGSN configurations include the IuPS Control Plane end-point details, i.e., the IuPS SCTP end-point addresses/ports in case of IuPS-IP, and ATM PVC values, in the case of IuPS-ATM. The offload gateway manager installs flow directors in the NPU corresponding to the configured end-point identifiers.

For the UMTS offload gateway service, the offload gateway manager implements a light-weight GTP stack capable of decoding and encoding GPRS tunneling protocol-control (GTP-C) messages as well as standard GTP mechanisms such as retransmission timers and attempts. In some embodiments, each primary PDP context is considered a separate call, even if it originates from the same subscriber. A callline can be allocated per primary PDP. A primary and any associated secondary PDP contexts can be anchored by the same callline. The credit allocation for a callline for the offload gateway service can be the same as that of the GGSN with NAT enabled. NAT'ing of subscriber data sessions can be carried out at the sessmgrs.

In some embodiments, the UMTS offload gateway uses a common GTP service flow (per service-ip-address per sessmgr) for subscribers connecting via a given offload gateway service instance. Downlink data packets received from the GGSN can be forwarded to the RNC serving the subscriber. Downlink data packets received on the public network, first pass through the NAT module before being sent to the offload gateway module. Uplink data packets are either forwarded out the public network via the NAT module or sent to the GGSN if the packet does not match the NAT rules. For the UMTS offload gateway service, the sessmgrs implement a GTP stack capable of handling both GTP-C and GTP-U messages.

Figure 18:
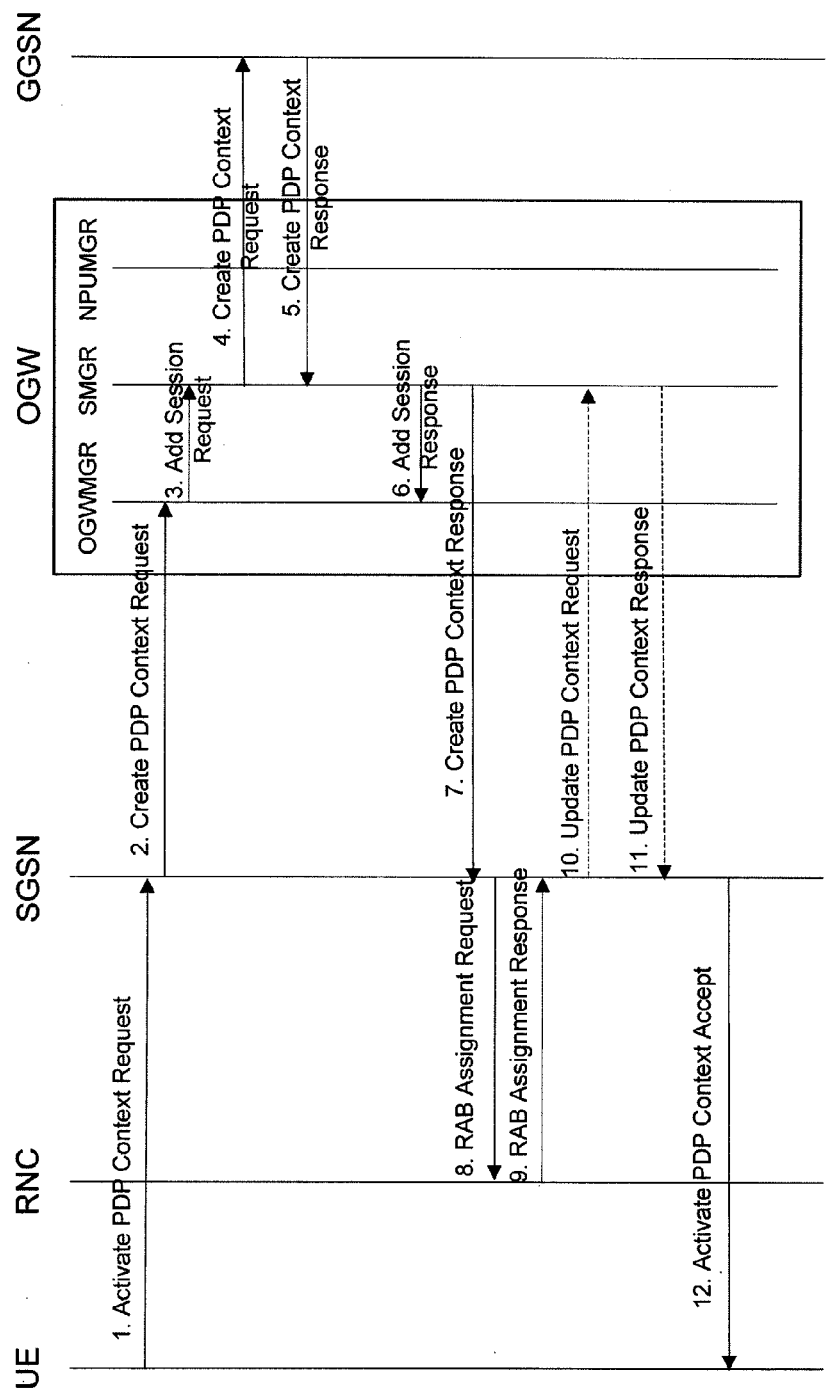
FIG. 18 illustrates a messaging flow for establishing a session through PDP context activation in accordance with some embodiments.

FIG. 18 illustrates a messaging flow for establishing a session through PDP context activation in accordance with some embodiments. In step 1, the UE generates an activate PDP context request message. If the offload gateway is in a standalone operation mode, the offload gateway tracks this activate PDP context request until the offload decision can be made on the Gn side. If the offload gateway is in SGSN assisted mode, then this message may not be available to the offload gateway and the offload gateway can receive this information from the SGSN.

In step 2, the SGSN resolves the APN to the offload gateway and sends a create PDP context (CPC) request message with its TEIDs (control and user plane) and IP addresses (control and user plane) to be used by the GGSN as the destination identifiers in all subsequent messages for this PDP or session. In step 3, the create PDP context request message is received at the offload manager (OGWMGR). If the create PDP context is for a new subscriber, the offload eligibility is checked. If the create PDP context is to be offloaded, the offload gateway manager adds the subscriber to its data structures and load balances the create PDP context request to a session manager (SMGR) via an add-session-request. In step 4, the create PDP context request is processed by the session manager which allocates a callline and other resources such as the TEIDs, resolves the APN and, sends a modified create PDP context request message to the GGSN.

In step 5, the GGSN processes the create PDP context request message and sends the response back to the offload gateway, which is received at the session manager handling the call session. If the PDP was setup successfully at the GGSN, the session manager allocates NAT resources. In step 6, an add-session-response indicating the status of the call session is sent back to the offload gateway manager. In step 7, the offload gateway sends an appropriate create PDP context response message to the SGSN. In step 8, on a successful create PDP context setup, the SGSN will seek a radio access bearer (RAB) assignment for the PDP context. The RAB assignment my not be used by the offload gateway in the "SGSN Assisted" mode. In the standalone mode, the RAB assignment request is parsed to obtain the IuPS side GTP-U IP address and TEIDs assigned by the SGSN.

In step 9, in the standalone mode, the RAB assignment response is parsed to obtain the IuPS side GTP-U IP addresses and TEIDs assigned by the RNC. In step 10, direct-tunnel is enabled at the SGSN, if in "SGSN Assisted" mode of operation. This causes the SGSN to send an update PDP context request message towards the offload gateway, which is received at the session manager handling the PDP. This request is terminated at the offload gateway and not forwarded to the GGSN. The offload gateway notes the GTP-U IP address and TEID being used for the data-session. In step 11, the offload gateway responds to the update PDP context request message with a update PDP context message include a success cause. In step 12, the SGSN sends a PDP context activation accept message to the UE.

Figure 19:
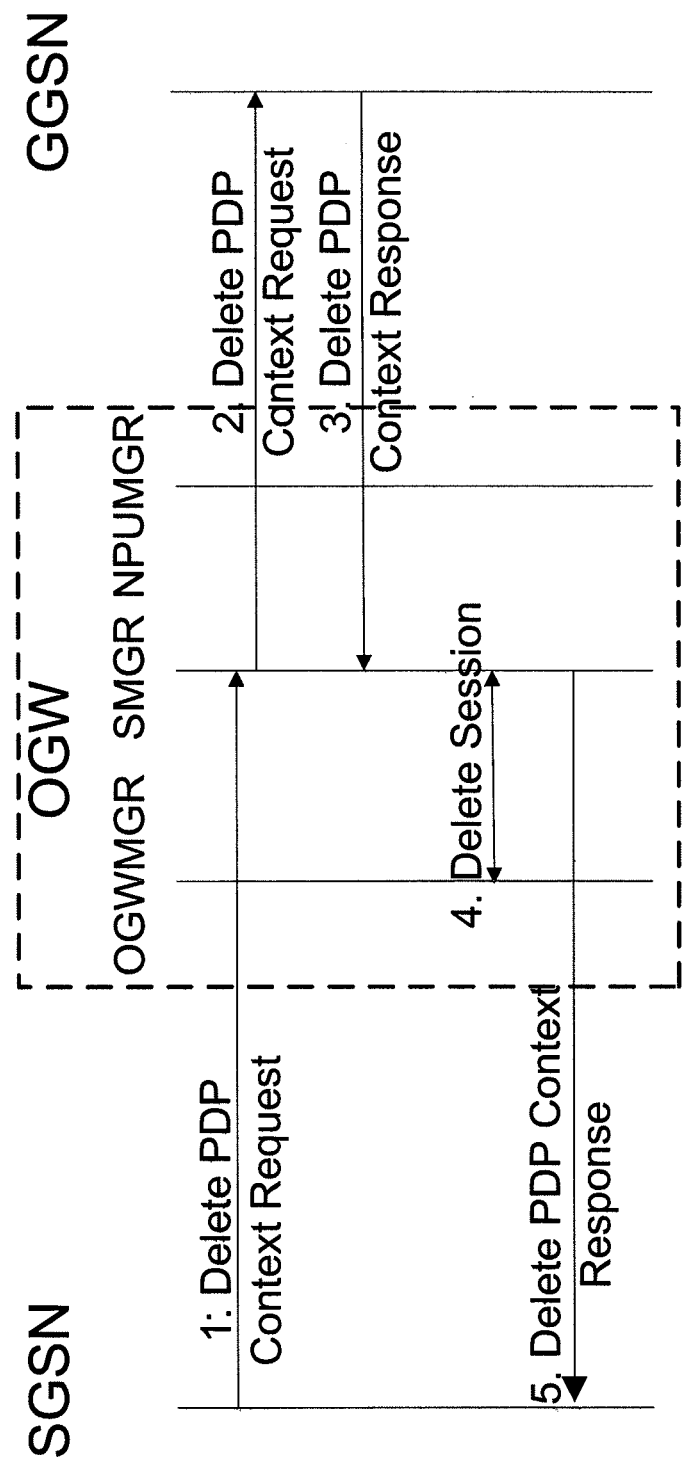
FIG. 19 illustrates a messaging flow for user equipment/SGSN session deactivation at a component level in the offload gateway in accordance with certain embodiments.

FIG. 19 illustrates a messaging flow for user equipment/SGSN session deactivation at a component level in the offload gateway in accordance with certain embodiments. In step 1, the SGSN sends a delete PDP context (DPC) request to the offload gateway, which is received at the session manager (SMGR) handling the call. In step 2, the session manager forwards the request to the GGSN after switching the offload gateways TEID and IP destination IP address/UDP port in the GTP header to the values assigned by the GGSN during the create PDP context setup. In step 3, the GGSN deletes the PDP context and sends the delete PDP context response back to the offload gateway, which is received at the session manager. In step 4, the session manager sends a delete-session to the offload manager (OGWMGR). In step 5, the session manager sends the delete PDP context response back to the SGSN and releases the associated resources of the session.

Figure 20:
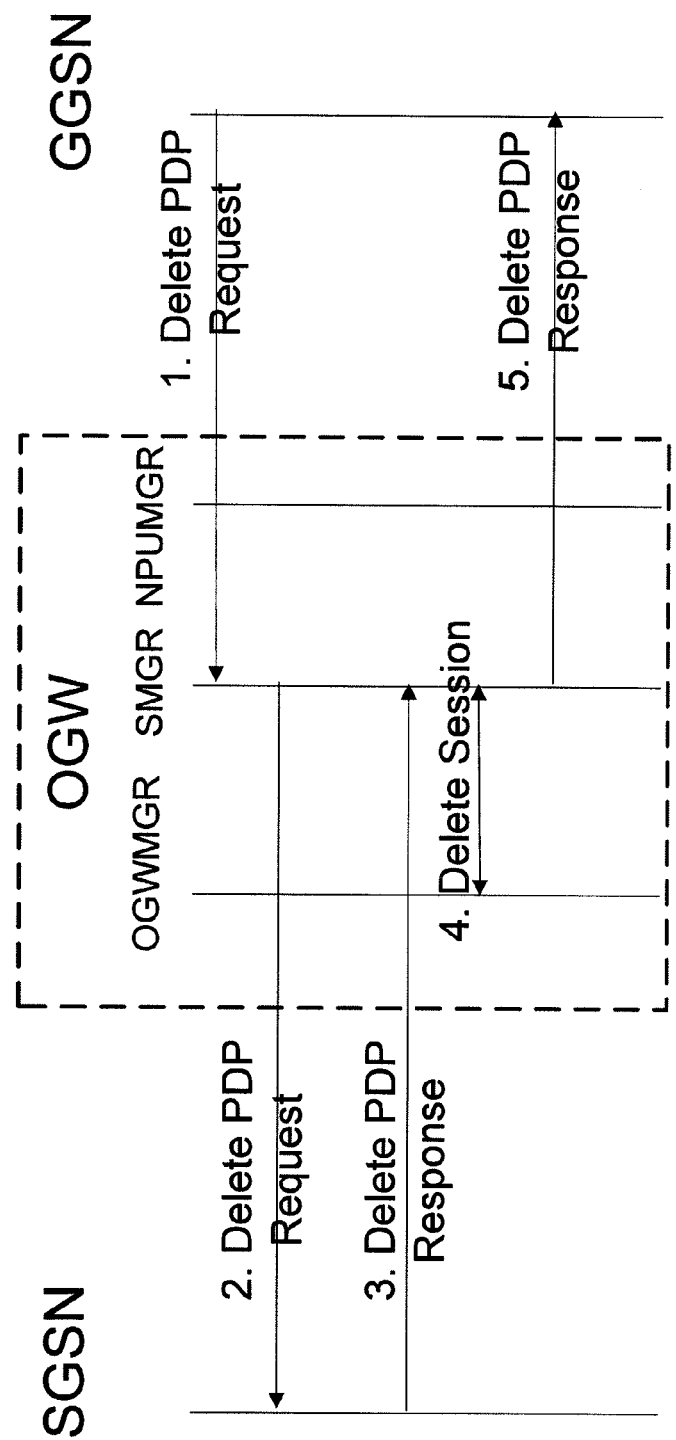
FIG. 20 illustrates a message flow for a GGSN session deactivation at a component level in the offload gateway in accordance with certain embodiments.

FIG. 20 illustrates a message flow for a GGSN session deactivation at a component level in the offload gateway in accordance with certain embodiments. In step 1, the GGSN sends a delete PDP context request to the offload gateway, received at the session manager (SMGR) handling the session. In step 2, the session manager forwards the request to the SGSN after switching the offload gateways TEID and IP destination IP address/UDP port in the GTP header to the values assigned by the SGSN during create PDP context setup. In step 3, the SGSN deletes the PDP context and sends the delete PDP context response back to the offload gateway, which is received at the session manager. In step 4, the session manager sends a delete-session to the offload manager (OGWMGR). In step 5, the session manager sends the DPC response back to the GGSN and releases the associated resources for the session including the callline.

Figure 21:
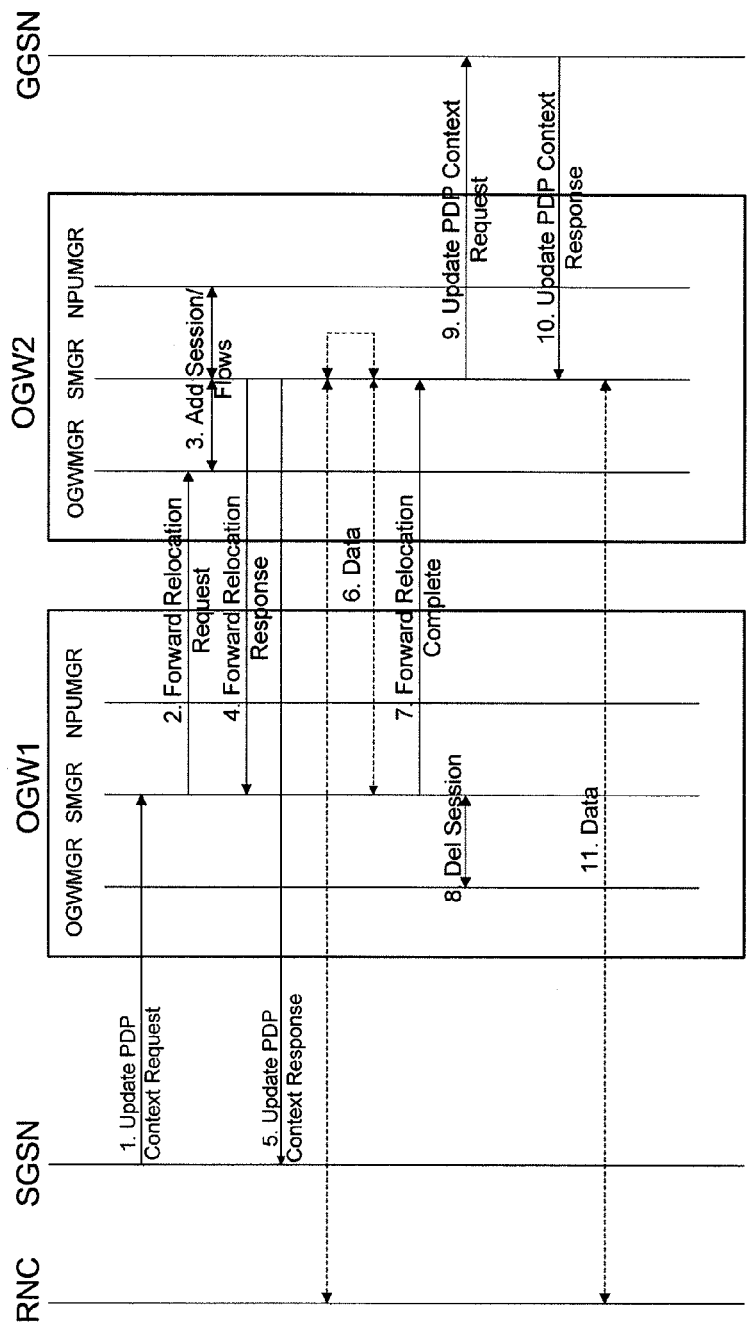
FIG. 21 illustrates inter-offload gateway relocation at the component level in SGSN assisted mode in accordance with certain embodiments.

FIG. 21 illustrates inter-offload gateway relocation at the component level in SGSN assisted mode in accordance with certain embodiments. In step 1, on a radio network controller (RNC) change, the SGSN sends an update PDP context (UPC) request to offload gateway 1 (OGW1). The DTI bit of the DTI IE, if present, indicates the change of RNC GTPU end-points. This is received at the session manager (SMGR) handling the PDP or session. In step 2, the session manager looks up an RNC table using the service-area-id or the RNC IP (sent as SGSN address in the update PDP context request message) to identify the offload gateway, and the offload gateway 2 (OGW2) for the new RNC. The session manager sends a forward relocation request message to the OGW2, to indicate that OGW2 is taking over the anchoring of the PDP context. This messages is received at the offload manager (OGWMGR) of OGW2. In some embodiments, the forward relocation request message has been modified for the purposes of supporting offload gateway relocation. The information that is included in the forward relocation request message can include the IMSI, TEID-C (i.e., OGW1's control plane TEID for this transaction), charging characteristics, PDP context, SGSN Address for Control Plane (this is OGW1's control-plane address in use for this PDP), Direct Tunnel Flags (copied from the update PDP context message), and Private Extension ("offload gateway Relocation", containing information from the original update PDP context).

In step 3, the OGW2 offload gateway manager allocates resources for the PDP and load balances to a session manager using the add-session mechanism and sends a forward relocation response message back to offload gateway, as an acknowledgement. The session manager allocates a callline and other resources such as TEID's for the call and installs corresponding NPU flow directors. In step 4, the OGW2 session manager sends a "Forward Relocation Response" message back to the OGW1. The contents of the response message can include information such as cause, TEID-C (to be used by OGW1 for all further control plane communication related to the PDP), Tunnel Endpoint Identifier Data II (OGW2's teid-u allocated for the PDP), SGSN Address for Control plane (OGW2's control plane ip address for the PDP), SGSN Address for User Traffic (OGW2's data plane ip address for the PDP). The message is received at the session manager in OGW1 that is handling the PDP.

In step 5, the OGW2 session manager sends the SGSN the upgrade PDP context response to the update PDP context request received by OGW1. This response can include information such as cause, Tunnel Endpoint Identifier Data I (OGW2's teid-u allocated for this PDP), Tunnel Endpoint Identifier Control Plane (OGW2's teid-c allocated for this PDP), GGSN Address for Control Plane (OGW2's control plane IP address used for this PDP), GGSN Address for User Traffic (OGW2's data plane IP address used for this PDP), alternative GGSN Address for Control Plane (OGW2's alternate control-plane IP address for this PDP, if any), and alternative GGSN Address for Data Plane (OGW2's alternate data-plane IP address for this PDP, if any). In step 6, if there is an existing NAT session, the session managers at OGW1 and OGW2 can be in the data path. In some embodiments, the data flows in the following manner: Downlink: OGW1-Sessmgr→OGW2-Sessmgr→RNC and Uplink: RNC→OGW2-Sessmgr→OGW1-Sessmgr.

In step 7, once any ongoing NAT session is completed, the OGW1 session manager sends a forward relocation complete message to OGW2. On receipt of the "Forward Relocation Complete" message, the OGW2 session manager sends an update PDP context to the GGSN with the contents of the original update PDP context from the SGSN modified to reflect OGW2 as the source. The OGW2 session manager also removes references to OGW1 for the PDP. In step 8, the OGW1 session manager will release local resources including the callline and causes the deletion of the session at the offload gateway manager. In step 9, OGW2s update PDP context request is processed at the GGSN.

In step 10, the GGSN sends the update PDP context response back to the OGW2. This update PDP context response message is received at the session manager handling the PDP, and the session manager processes it for any changes to the GGSNs TEIDs or addresses. Any change in PCO, QoS profile, APN restriction, or MS Info Change Reporting Action trigger a new update PDP context request (not shown in call flow) from OGW2 to the SGSN. In step 11, all further data sessions for this PDP, will be NAT'd at the OGW2 session manager.

Security in Offloading

The offloading of user data, to a public network such as the Internet, as close to the radio network as possible is highly desirable to reduce the control the ever growing requirement for large-scale bandwidth increases across the entire transport path from the radio to the packet core. Security can be provided by defining a mechanism for the offload gateway to provide user equipment and/or network devices on the Internet with cipher keys to the offload gateway. These keys can be used to decrypt and encrypt messages to offload a subscribers data.

The keys can be supplied to the offload gateway by the SGSN or SGW by sending modified control plane messages to carry the negotiated keys. The offload gateway can be used to negotiate the keys. The offload gateway can also inspect packets to authenticate that a packet received from the Internet does not compromise the security of the mobile operator's network. Packets that are received and cannot be authenticated are dropped.

User Equipment and Gateway

The user equipment described above can communicate with a plurality of radio access networks using a plurality of access technologies and with wired communication networks. The user equipment can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The offload gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 22:
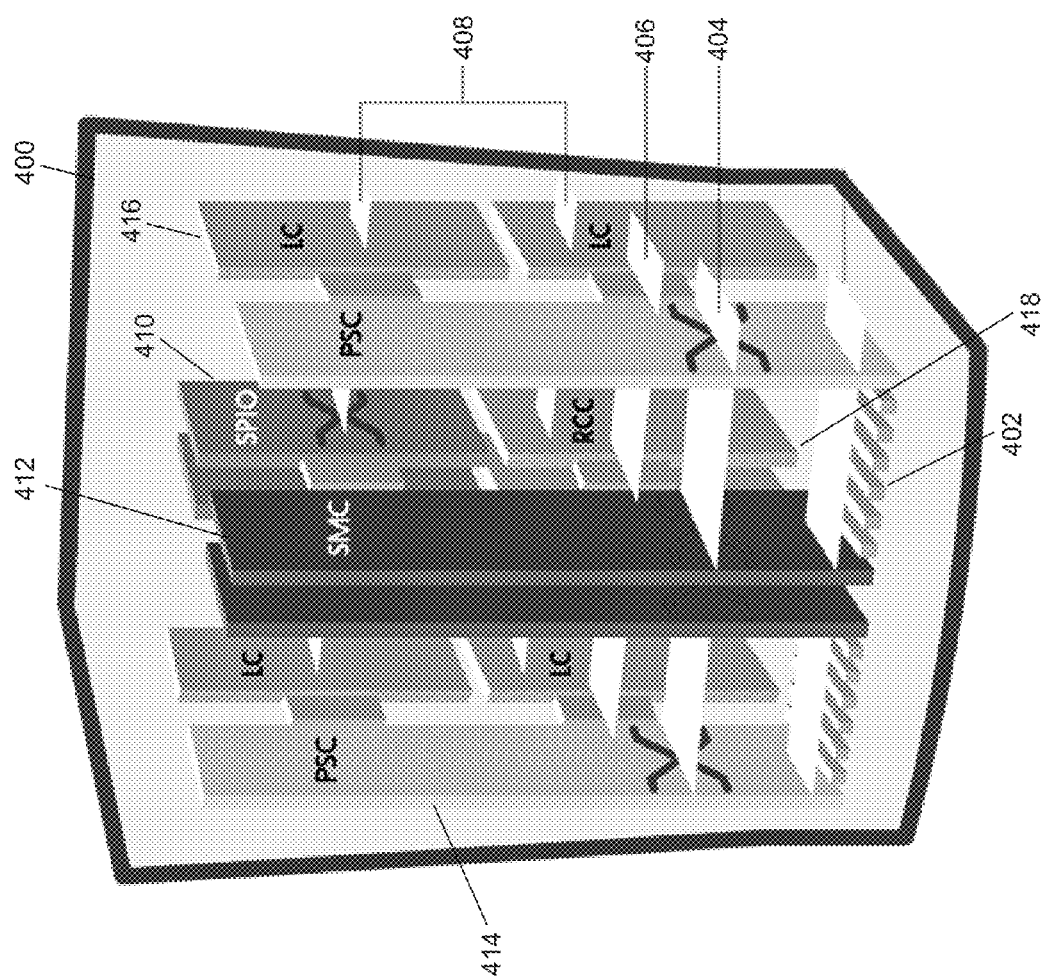
FIG. 22 illustrates a network device configuration in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 22 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 23:
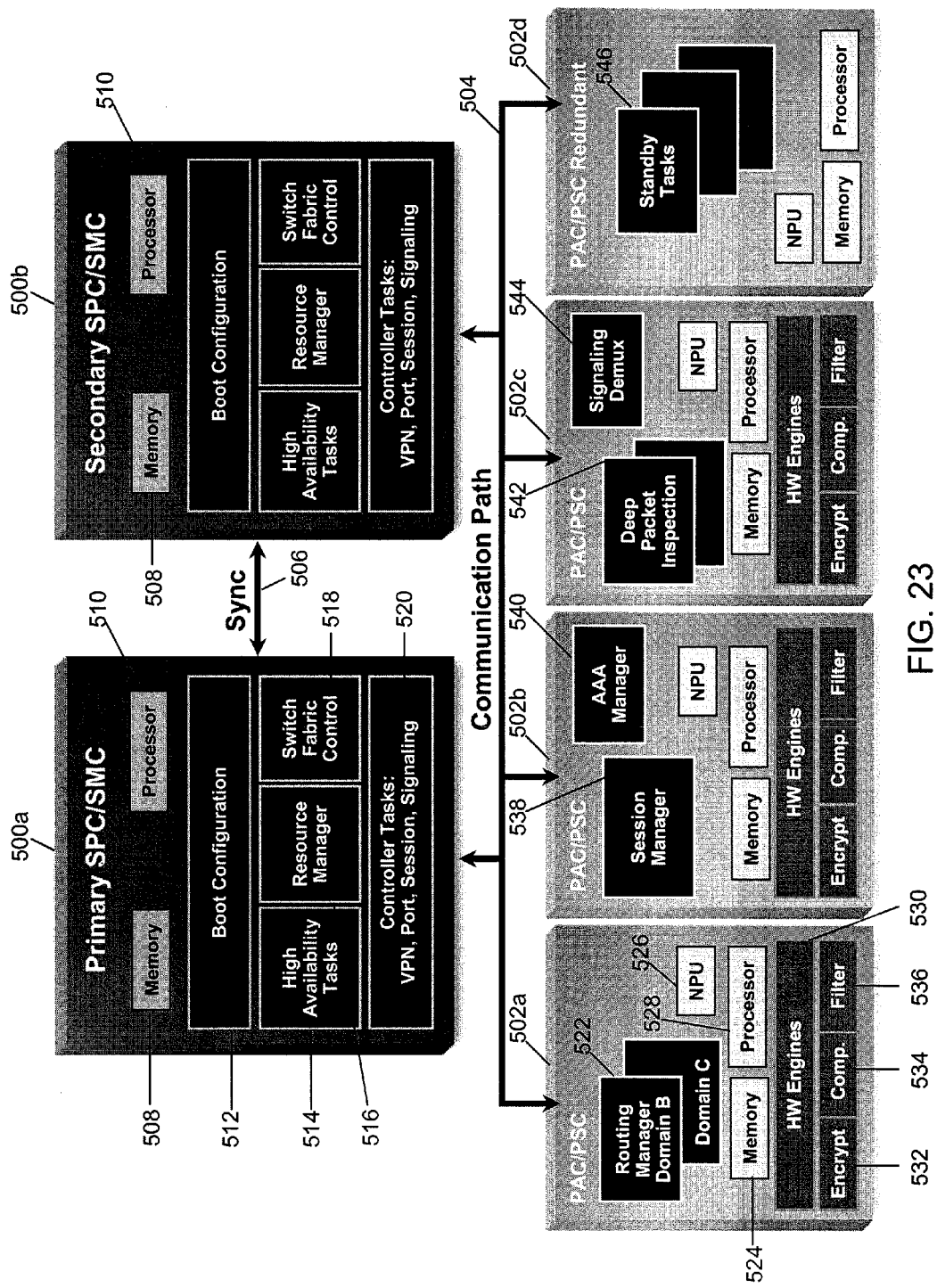
FIG. 23 illustrates an architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 23 illustrates a logical view of the software architecture of a network device in accordance with certain embodiments. As shown, the software and hardware can be distributed within the network device and across different circuit boards, processors, and memory. FIG. 23 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502*a* provides routing managers 522 with each covering routing of a different domain. PAC/PSC 502*b* provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502*d* provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, LTE functionality such as a PDN gateway can be combined or co-located with the MME.

We claim:

1. An offload gateway comprising:
   one or more interfaces configured to communicate with a gateway in a packet core network, with the Internet without passing through the packet core network, and with user equipment (UE) via one or more access networks;
   the offload gateway configured to inspect a received control plane packet and obtain information from the received control plane packet that is used to determine offload eligibility for data packets corresponding to the received control plane packet, wherein the received control plane packet comprises information used to configure a session for the data packets corresponding to the received control plane packet;
   offload logic configured to determine the offload eligibility of the data packets corresponding to the received control plane packet based on criteria and, in response to the criteria being met, to offload the data packets corresponding to the received control plane packet onto the Internet such that the gateway in the packet core network is bypassed; and
   a network address translation functionality that is configured to modify data packets selected for offload by the offload logic such that the data packets selected for offload are routed through the Internet at the offload gateway.

2. The offload gateway of claim 1, wherein the offload logic determines whether to direct the received control plane packet to a service LAN.

3. The offload gateway of claim 1, further comprising a proxy that is configured to capture subscriber and session information during connection setup with the offload gateway.

4. The offload gateway of claim 1, further comprising a control plane interface that is configured to provide mobility for offloaded data packets and allow for relocation to a second offload gateway.

5. The offload gateway of claim 1, wherein the offload logic evaluates information such as application type and access point name (APN) to determine whether to offload data packets.

6. The offload gateway of claim 1, further comprising a charging function that generates a call detail record (CDR) when data packets are offloaded.

7. The offload gateway of claim 1, further comprising an IuPS interface for communicating with a radio network controller and an Iuh interface for communicating with a home nodeB (HNB) and wherein the first interface is a Gn interface and the second interface is a Gi interface.

8. The offload gateway of claim 1, further comprising an S1-U interface for communicating with an evolved nodeB (eNB) and wherein the first interface is an S5 interface and the second interface is a SGi interface.

9. A method comprising:
   establishing a session on an offload gateway to communicate with a user equipment (UE), wherein the session is configured by receiving a control plane packet on an interface at the offload gateway;
   inspecting the control plane packet to obtain information regarding the session to make an offload determination;
   determining if the session meets offload criteria by comparing information obtained from inspection with offload logic criteria; and
   upon determining that the session is offload eligible, modifying the control plane packet at a network address translation functionality to route data packets corresponding to the session onto the Internet to bypass a packet core network.

10. The method of claim 9, further comprising:
receiving a second packet bound for the user equipment at the offload gateway from the Internet; and
modifying the packet at a network address translation functionality to route the packet onto the radio access network to the user equipment.

11. The method of claim 9, further comprising:
receiving a relocation request at the offload gateway to receive a transfer session from a second offload gateway;
receiving information regarding the session from the second offload gateway including information regarding offload criteria and network address functionality information;
receiving data packets that are offload eligible and determining whether to offload the offload eligible data packets using information received from the second offload gateway; and
offloading eligible data packets using network address translation information received from the second offload gateway.

12. The method of claim 9, further comprising determining at the offload logic whether to direct the control plane packet to a service LAN.

13. The method of claim 9, further comprising capturing subscriber and session information during connection setup at the offload gateway.

14. The method of claim 9, further comprising evaluating information at the offload logic such as application type and access point name (APN) to determine whether to offload data packets.

15. The method of claim 9, further comprising generating a call detail record (CDR) when data packets are offloaded.

16. The method of claim 9, further comprising communicating with a radio network controller on an IuPS interface, communicating with gateway GRPS support node (GGSN) on a Gn interface, and communicating with the Internet on a Gi interface.

17. The method of claim 9, further comprising communicating with an evolved nodeB (eNB) on an S1-U interface, communicating with a PDN gateway on an S5 interface, and communicating with the Internet on an SGi interface.

18. Logic encoded on one or more non-transitory tangible media for execution and when executed operable to:
establish a session on an offload gateway to communicate with a user equipment (UE), wherein the session is configured by receiving a control plane packet on an interface at the offload gateway;
inspect the control plane packet to obtain information regarding the session to make an offload determination;
determine if the session meets offload criteria by comparing information obtained from inspection with offload logic criteria; and
upon determining that the session is offload eligible, modify the control plane packet at a network address translation functionality to route data packets corresponding to the session onto the Internet to bypass a packet core network.

19. The logic of claim 18, further comprising:
receiving a second packet bound for the user equipment at the offload gateway from the Internet; and
modifying the packet at a network address translation functionality to route the packet onto the radio access network to the user equipment.

20. The logic of claim 18, further comprising:
receiving a relocation request at the offload gateway to receive a transfer session from a second offload gateway;
receiving information regarding the session from the second offload gateway including information regarding offload criteria and network address functionality information;
receiving data packets that are offload eligible and determining whether to offload the offload eligible data packets using information received from the second offload gateway; and
offloading eligible data packets using network address translation information received from the second offload gateway.

* * * * *